United States Patent [19]

Maeda et al.

[11] Patent Number: 5,675,664
[45] Date of Patent: Oct. 7, 1997

[54] IMAGE PROCESSING DEVICE

[75] Inventors: Hiroshi Maeda; Toshihiro Okahashi, both of Kashihara, Japan

[73] Assignee: Sharp Kabushiki Kaisha, Osaka, Japan

[21] Appl. No.: 246,700

[22] Filed: May 20, 1994

[30] Foreign Application Priority Data

Jun. 16, 1993 [JP] Japan .................................. 5-144125

[51] Int. Cl.$^6$ ...................................... G06K 9/48
[52] U.S. Cl. ........................................ 382/199
[58] Field of Search .............. 382/22, 50, 266, 382/267, 270, 274, 199

[56] References Cited

U.S. PATENT DOCUMENTS

| | | | |
|---|---|---|---|
| 4,868,684 | 9/1989 | Suzuki | 358/455 |
| 4,903,316 | 2/1990 | Hongo et al. | 382/52 |
| 4,908,872 | 3/1990 | Toriu et al. | 382/22 |
| 5,177,795 | 1/1993 | Tanioka et al. | 382/50 |

FOREIGN PATENT DOCUMENTS

| | | |
|---|---|---|
| 100811 | 2/1984 | European Pat. Off. |
| 234590 | 9/1987 | European Pat. Off. |
| 234809 | 9/1987 | European Pat. Off. |
| 527574 | 2/1993 | European Pat. Off. |
| 1115271 | 5/1989 | Japan |
| 1115272 | 5/1989 | Japan |

Primary Examiner—Joseph Mancuso
Assistant Examiner—Gerard Del Rosso

[57] ABSTRACT

This invention provides an image processing device which is capable of discriminating an edge even on a faint image by changing the edge discriminating parameters according to the gray-level values set in its control portion. An edge discriminating circuit discriminates an edge on an image and a gray-level converting portion then conducts gray-level conversion of the image and determines changeable set values of gray-levels. After this an edge discriminating circuit conducts the discrimination of an edge of the image. In this case the set values of gray-levels are given to the edge discriminating circuit to enable the latter to easily discriminate the edge portion having a low variation when the image has lowered gray-levels.

12 Claims, 40 Drawing Sheets

| A | B | C |
|---|---|---|
| D | E | F |
| G | H | I |

✱ATTENTIONAL PIXEL

| EDGE NO. | E | F | A | B | C | D |
|---|---|---|---|---|---|---|
| 01 | 0 | 0 | 1 |   |   |   |
| 02 |   | 0 | 2 |   |   |   |
| 03 |   | 0 | 3 |   |   |   |
| 04 |   |   | 0 | 2 |   |   |
| 05 |   |   | 0 | 3 |   |   |
| 06 |   |   |   | 1 |   |   |
| 07 |   |   |   | 2 | 0 | 0 |
| 08 |   |   |   | 3 | 0 |   |
| 09 |   | 0 | 0 | 1 | 0 |   |

0 (WHITE)
1 ↑
2 ↓
3 (BLACK)

FIG.16

| No. | INPUT DATA | | | | | | DISCRIMINATION BY CONVENTIONAL METHOD | DISCRIMINATION BY METHOD ACCORDING TO THE PRESENT INVENTION |
|---|---|---|---|---|---|---|---|---|
| | | | * | * | | | | |
| I | 3 | 2 | 1 | 0 | 1 | 2 | NON-EDGE | EDGE |
| II | 3 | 3 | 2 | 1 | 0 | 1 | NON-EDGE | EDGE |
| III | 1 | 0 | 1 | 2 | 3 | 2 | NON-EDGE | EDGE |
| IV | 1 | 0 | 1 | 3 | 3 | 3 | NON-EDGE | EDGE |
| V | 0 | 0 | 1 | 1 | 2 | 3 | 0 1 | EDGE |
| VI | 0 | 0 | 0 | 1 | 2 | 1 | 0 9 | EDGE |
| VII | 0 | 0 | 1 | 1 | 0 | 0 | 0 1 | EDGE |
| VIII | 3 | 3 | 3 | 3 | 3 | 3 | NON-EDGE | NON-EDGE |
| IX | 1 | 2 | 2 | 2 | 2 | 2 | NON-EDGE | NON-EDGE |

* * ATTENTIONAL PIXEL

IN CASE OF C >= 2S

IN CASE OF C >= 2S

FIG.26

| SET GRAY-LEVEL | TH |
|---|---|
| 1 | 1/2 |
| 2 | 2/3 |
| 3 | 2/2 |
| 4 | 3/2 |
| 5 | 2/1 |

FIG.27

| A | B | C (ATTENTIONAL PIXEL) | D | E | VALUE F | EDGE DISCRIMINATION RESULT (AT GRAY-LEVEL OF 3) |
|---|---|---|---|---|---|---|
|   |   | 0 | 1 | 1 |   | 1/2 |   |
|   |   | 0 | 1 | 1 | 2 | 2/3 |   |
|   |   | 0 | 1 | 1 | 3 | 3/3 | * |
|   |   | 0 | 1 | 2 | 3 | 3/3 | * |
|   |   | 0 | 1 | 2 |   | 2/2 | * |
|   |   | 0 | 1 | 3 |   | 3/2 | * |
| 0 |   | 1 | 1 |   |   | 1/2 |   |
|   |   | 0 | 2 |   |   | 2/1 | * |
| 0 | 1 | 2 |   |   |   | 2/2 | * |
| 0 | 2 | 2 |   |   |   | 2/2 | * |
|   |   | 0 | 3 |   |   | 3/1 | * |
| 0 | 1 | 3 |   |   |   | 3/2 | * |
| 0 | 2 | 3 |   |   |   | 3/2 | * |
| 0 | 3 | 3 |   |   |   | 3/2 | * |

\* PATTERN DISCRIMINATED AS AN EDGE PATTERN

DISCRIMINATING PATTERN

| LEFT REFERENCE | RIGHT REFERENCE | UP REFERENCE | DOWN REFERENCE | DISCRIMINATION FLAG | DISCRIMINATION PATTERN No. | |
|---|---|---|---|---|---|---|
| 0 | 0 | — | — | 0 | 0 | HALF-TONE |
| 0 | 1 | — | — | 1 | a | HALF-TONE |
| 1 | 0 | — | — | 2 | b | HALF-TONE |
| 1 | 1 | 0 | 0 | 3 | c | CHARACTER REGION |
| 1 | 1 | 0 | 1 | 4 | d | CHARACTER REGION |
| 1 | 1 | 1 | 0 | 5 | e | CHARACTER REGION |
| 1 | 1 | 1 | 1 | 6 | f | HALF-TONE |

TABLE OF DISCRIMINATION PATTERNS

FIG.33

HORIZONTAL SCANNING
→ DIRECTION

↓   A B C D E   LEFT REFERENCE

VERTICAL SCANNING DIRECTION

E D C B A   RIGHT REFERENCE

A
B
C   UP REFERENCE
D
E

E
D
C   DOWN REFERENCE
B
A

DISCRIMINATION REFERENCE

X-CHARACTER REGION

← DISCRIMINATING
(* ATTENTIONAL PIXEL)

| LEFT REFERRED EDGE | RIGHT REFERRED EDGE | DISCRIMINATION |
|---|---|---|
| 0 | 0 | 0 |
| 1 | 0 | a |
| 0 | 1 | c |
| 1 | 1 | b |

FIG.42

| A | B | C<br>(ATTENTIONAL<br>PIXEL) | D | E | VALUE F |
|---|---|---|---|---|---|
|   | 0 | 1 | 1 |   | 1/2 |
|   | 0 | 1 | 1 | 2 | 2/3 |
|   | 0 | 1 | 1 | 3 | 3/3 |
|   | 0 | 1 | 2 | 3 | 3/3 |
|   | 0 | 1 | 2 |   | 2/2 |
|   | 0 | 1 | 3 |   | 3/2 |
| 0 | 1 | 1 |   |   | 1/2 |
|   | 0 | 2 |   |   | 2/1 |
| 0 | 1 | 2 |   |   | 2/2 |
| 0 | 2 | 2 |   |   | 2/2 |
|   | 0 | 3 |   |   | 3/1 |
| 0 | 1 | 3 |   |   | 3/2 |
| 0 | 2 | 3 |   |   | 3/2 |
| 0 | 3 | 3 |   |   | 3/2 |

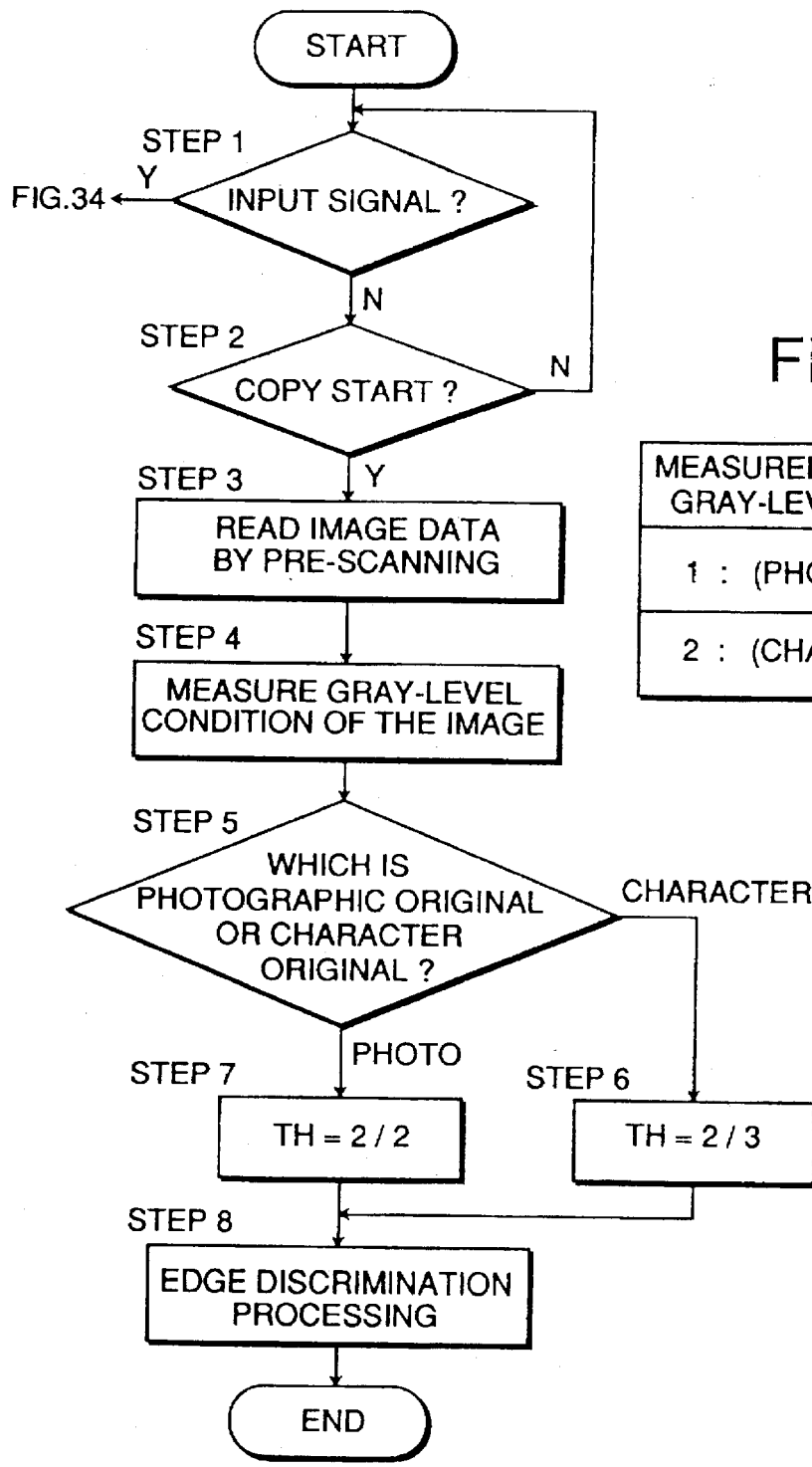

IMAGE PROCESSING DEVICE

BACKGROUND OF THE INVENTION

The present invention relates to an image processing device and, more particularly, to an image processing device which is capable of discriminating an edge portion from a non-edge portion in an image by specifying the parameters according to quantized data obtained by gray-level (half-tone) image processing. Furthermore, it relates to an image processing device capable of accurately discriminating an edge portion of a faint image by changing the discriminating parameters of the edge portion on the image according to gray-level settings by means of its control portion. The device may be used, for example, in a digital type, plain paper copier and an image printer.

In the conventional processing of gray-level images, quantized image data is directly printed out. For instance, image data input as digital information includes pixels each having a gray-level in the range of, e.g., 0 to 255. This means that a stream of 8 bits is required to represent each pixel having a gray-level in the range of 0 to 255 if no additional processing is done. A tremendous memory capacity may be required to store whole image data. In addition, there must be a printer which is capable of reproducing images of gray-levels that vary from 0 to 255.

The present invention seeks to provide an image processing device to reproduce scanned images of the gray-level generally available to printers having a low memory capacity and relatively low power for reproducing the gray shades of an image, wherein it is necessary to reduce the amount of information carried by a pixel and to decrease the number of gray shades of each pixel.

The processing procedure begins with the reading of image data having gray-levels of pixels from 0 to 255. The read-in data is quantized for gray-levels of 0 to 255.

For instance, the gray levels (0 to 255) of the data are quantized at points W, X, Y, and Z. The quantization is made for discriminating input data "f" with reference to the preset threshold values t1, t2 and t3 as follows:

W if $255 \geq f > t1$;

X if $t1 \geq f > t2$;

Y if $t2 \geq f > t3$;

Z if $t3 \geq f \geq t0$.

However, each set of quantized data may not faithfully represent the gray-levels of local portions on the original, resulting therefore in a lack of smoothness of representation of the image. To eliminate the above-mentioned local defect, the difference between the gray-levels of the image and of the original which occurred in the quantization process, is detected as an error that is processed to give an effect to the gray-levels of the pixels around an attentional one. The gray-levels in the detail of the original image can be more convincingly represented by the processed, quantized image data.

For instance, conventional edge discrimination is achieved by quantizing input data from an image scanner through a gray-level recording circuit and by checking whether the quantized data relates to an edge or a non-edge portion. Furthermore, parameters used for detecting an edge within an image have fixed values experimentally obtained. Another method is the so called pattern matching method that checks whether input data match with two or more specified patterns which have been experimentally determined as possible edge patterns.

A prior art image processing device is described in the Japan Laid-open Patents No. 1-115271 and No. 1-115272. The prior art discloses an edge detecting procedure that converts analog image data input through a charge-coupled device (CCD) to digital image data; corrects for shading; detects a maximal value and a minimal value within the region of 3×3 pixels; subtracts the minimal value from the maximal value; and compares a difference in value with the threshold value to determine whether the pixels are an edge when the difference is larger than the threshold or whether the pixels are a non-edge portion when the difference is smaller than the threshold.

As mentioned above, a conventional gray-level, image processing circuit is required to detect a specified pattern among 4906 patterns (4 quantized values and 6 pixels require $4^6$ patterns to be checked). As the number of quantized values and pixels increases, the number of patterns increases as well. This makes it more complicated to search for specific patterns that are likely to be an edge.

There are only 9 specified patterns, but to increase the accuracy rate of edge discrimination, it is necessary to input tens or hundreds of patterns extracted from the 4906 patterns, experimentally considered to be edges. This represents a very complicated operation. Furthermore, only patterns stored in a ROM or a RAM are recognized as edge patterns. Therefore, mistakes in discrimination may arise since memorized patterns are not enough to cover all the possible edge patterns.

Gray-level conversion is more effective for improving an image's quality when it is conducted after the edges have been discriminated within the image. However, if an input image, e.g., of faint characters, has low gray-levels, the characters cannot be detected as edges by the use of conventional fixed parameters. It is therefore desirable to make patterns vary according to the gray-levels of an image and to selectively use parameters for low gray-level images (to reliably detect edges) and parameters for a high gray-level image (in order not to detect non-edge pixels).

For example, if a pattern having a gray-level difference of not less than 3 is an edge, the difference is reduced to 2 after gray-level conversion and is recognized as a non-edge portion.

In the prior art described in the above-mentioned publication, an edge is coarsely detected from a region of x×z pixels and a mistake in discrimination may take place in a half-tone edge portion. Since the prior art uses a fixed threshold, it is difficult to detect an edge when the image data is processed to have lower gray levels.

On the contrary, when an attentional pixel and m neighbors are examined in place of detecting an edge from a region of x×z pixels and a gradient of gray levels is calculated, an edge portion and a non-edge portion can be discriminated according to the calculated value of gradients of the gray-levels. This allows for detecting edges from the details of the image and to attain a higher accuracy of edge detection. By using a variable threshold, it is possible to accurately detect edges even in a faint image which is processed to have lowered gray-levels.

In the above-mentioned publication, there is no description of discriminating an edge portion on an image and on a region of an image according to data of an image gray-level gradient determined from a differential gray-level signal of adjacent pixels; setting positions of output pixels on an image-data output device according to gray-level gradient and the direction data of a gradient of image pixels calculated from a differential gray-levels signal of adjacent pixels; discriminating an edge portion by use of gray-level gradient discriminating means for discriminating a gradient of gray-levels of an image according to differential gray-level signal of adjacent pixels and image quality discriminating means for discriminating image quality according to data from the gray-level gradient discriminating means. An image processing device according to the present invention is capable of accurately discriminating edges even on a faint image since it carries out image processing according to the gradients of the image gray-levels.

SUMMARY OF THE INVENTION

It is an object of the present invention to provide an image processing device which is capable of discriminating an edge portion and a non-edge portion by a constant characteristic based on image data quantized by gray-level image processing and by detecting edges from an image of gray-levels lowered due to gray-level setting in controlled portions by selectively changing the parameters for discriminating edges within the image.

It is another object of the present invention to provide an image processing device which is capable of quantizing image data input by an image data reading device through a gray-level recording circuit; discriminating quantized data as relating to an edge portion or a non-edge portion by selecting an attentional pixel and m neighbors, calculating a gradient of gray-levels from the quantized data and checking whether it is larger than a specified gradient value to judge the attentional pixel to be of an edge portion or of a non-edge portion and, thereby, realizing the accurate discrimination of all edge portions and non-edge portions within an image.

It is another object of the present invention to provide an image processing device which processes an edge portion detected within an image differently from non-edge portions; employs an edge-discriminating method which by examining an attentional pixel and "n" pixels at right and left sides of the attentional one, determines a gradient of gray-levels and judges the attentional pixel as an edge if the gradient exceeds a specified threshold value; which can effectively discriminate the edges within an image having increased or reduced gray-levels by changing the threshold value to suit the increased or decreased gray-levels of the image; and which further distinguishes the discriminated edge by indicating a left-referred edge or a right-referred edge to process each of the divided portions of the pixel's region.

It is another object of the present invention to provide an image processing device which, in processing an original containing characters, enhances characters by providing a differential gray level of a nearly binarized condition for obtaining an easily readable character image, representing an image by pixels of n-valued gray-levels, i.e. o is white and n is black; discriminates edges and non-edges within an image and distinguishes each edge pixel by left or right references and converts data in such a way as to change the laser printing method depending on the type of edge, i.e. left edge or right edge, thus preventing the irregularity of the edge portions.

It is another object of the present invention to provide an image processing device which is capable of automatically controlling a threshold value to suit a gradient of gray-levels of an image according to the result of discrimination (photographic or character or gray-level image) by an image quality discriminating device.

The gray-levels of an image are detected pixel by pixel. A gradient of the image's gray-levels is determined according to a signal of differential gray-levels, and an edge on an image is detected according to the gray-level gradient value. The application of this process can eliminate complicated operations such as extraction and the generation of specified patterns; reduce the possibility of mis-judgement due to insufficient edge discriminating conditions and attain accurate discrimination of the edges within an image.

Furthermore, a discriminating gray-level of an edge of an image is preset according to data for discriminating a gradient of gray-levels of the image, by which an edge of the image is discriminated. A gradient of gray-levels and the direction of a gray-level gradient are discriminated, and a region of the image is determined based on the data. A pixel output position of an image output device is preset according to a signal of the gray-level gradient's value and a signal of the gradient's direction. The image quality is detected and the edge is discriminated on the basis of the data for gray-level gradient discrimination.

To realize the above-mentioned objects, the present invention was made to provide:

(1) An image processing device, comprising:
a gray-level sensing means for sensing the gray-levels of an image by pixel; an operational means for generating a differential gray-level signal of two neighboring pixels; a gray-level gradient discriminating means for discriminating a gradient of gray-levels according to the differential gray-level signal from the operational means; and an edge discriminating means for discriminating the edge of an image according to the data from the gray-level gradient discriminating means.

(2) An image processing device, comprising:
a gray-level sensing means for sensing the gray-levels of an image by pixel; an operational means for generating a differential gray-level signal of two neighboring pixels; a gray-level gradient discriminating means for discriminating a gradient of gray levels according to the differential gray-level signal from the operational means; a discriminating gray-level setting means for setting a discriminating gray-level of an edge on an image according to the data from the gray-level gradient discriminating means; and an edge discriminating means for discriminating an edge on an image according to the discriminating gray-level data from the discriminating gray-level setting means.

(3) An image processing device, comprising:
a gray-level sensing means for sensing the gray-levels of an image by pixel; an operational means for generating a differential gray-levels signal of two neighboring pixels; a gray-level gradient discriminating means for discriminating a gradient and the direction of the gray-levels according to the different gray-level signals from the operational means; and an image region discriminating means for discriminating an image region according to the gray-level gradient and directional data from the gray-level gradient discriminating means.

(4) An image processing device, comprising:
a gray-level sensing means for sensing the gray-levels of an image by pixel; an operational means for producing a differential gray-level signal of two neighboring pixels; a gray-level gradient discriminating means for discriminating a gradient and the direction of gray-levels according to the differential gray-level signal from the operational means; and an output control means for setting the positions of the output pixels of an output device according to the gray-level gradient and direction data from the gray-level gradient discriminating means.

(5) An image processing device, comprising:

a gray-level sensing means for sensing the gray-levels of an image by pixel; an operational means for generating a differential gray-levels signal of two neighboring pixels; a gray-level gradient discriminating means for discriminating a gradient of gray-levels according to the differential gray-level signal from the operational means; an image quality discriminating means for determining the quality of an image according to the data from the gray-level gradient discriminating means; and an edge discriminating means for determining an edge on an image according to the data from the gray-level gradient discriminating means and an edge discriminating signal from the image quality discriminating means.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 16 is a comparison view (1) for comparing results of edge discrimination according to the present invention with those according to the prior art;

FIG. 26 shows a table for showing a relationship between tonal-density setting values and setting parameters (TH) according to the present invention;

FIG. 27 shows a table for edge discrimination according to the present invention;

FIG. 28 shows original data to which edge discrimination shown in FIG. 27 is applied;

FIG. 29 shows an edge judging pattern in reference to a left pixel and a right pixel when gray levels of an image are set to 3 by applying the discrimination table to the original data as shown in FIG. 27;

FIGS. 30A and 30B show an edge discriminating pattern obtained by edge discrimination with a tonal density set at 1 according to the present invention;

FIGS. 31A and 31B shows a result of edge discrimination with gray-level set at 1 according to the prior art;

FIG. 32 is a flow chart for explaining a method of discriminating a left edge from a right edge according to the present invention;

FIG. 33 is a view for explaining in which direction a pixel is read-in in case of discriminating a region of pixels including an attentional one at the center thereof in reference to the left, right, up and down pixels according to the present invention;

FIG. 36 shows original data for explaining another example of an image processing device according to the present invention;

FIG. 37 is a view (part 1) for explaining how to determine a region based upon a result of left-edge or right-edge discrimination according to the present invention;

FIG. 38 is a view (part 2) for explaining how to determine a region based upon a result of left-edge or right-edge discrimination according to the present invention;

FIG. 42 shows an edge discriminating pattern with a left reference according to the present invention;

FIGS. 43A and 43B are views for explaining how to discriminate an edge on an image according to the present invention;

FIGS. 49A and 49B are flow charts describing a procedure for automatically measuring the gray-levels of an image to set a threshold value thereto.

PREFERRED EMBODIMENT OF THE INVENTION

Figure 1:
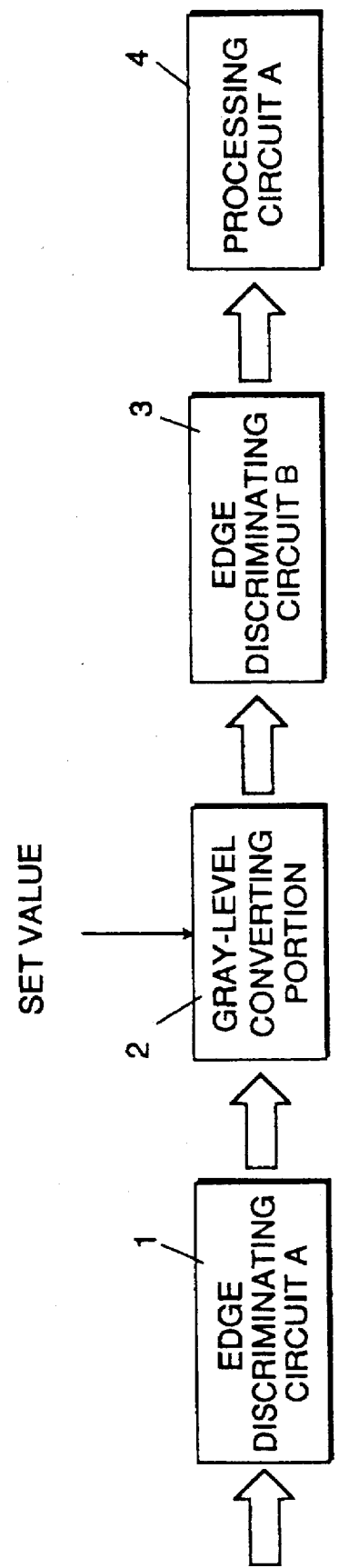
FIG. 1 is a view of a conventional edge discriminating method.

FIG. 1 is a construction view of a conventional half-tone image processing device which is composed of an edge discriminating circuit 1, a gray-level converting portion 2, an edge discriminating circuit 3 and a processing circuit 4. The edge discriminating circuit 1 discriminates the edge on an image and the gray-level converting portion 2 converts the gray-levels of the edge thereby determining a set value (changeable). The edge-discriminating circuit 3 discriminates the edge and the processing circuit 4 processes the image. However, in the processing circuit 4, there may be the influence of gray-level conversion. The conventional method allows only the gray-level converting portion 2 to change a set value of gray-level at the time of gray-level conversion. This may cause the problem that if the gray-levels of pixels of an image are reduced, the edge discriminating circuit 3 arranged behind the gray-level converting portion 2, may hardly discriminate an edge portion from non-edge portions due to the reduced difference of gray-levels.

Figure 2A:
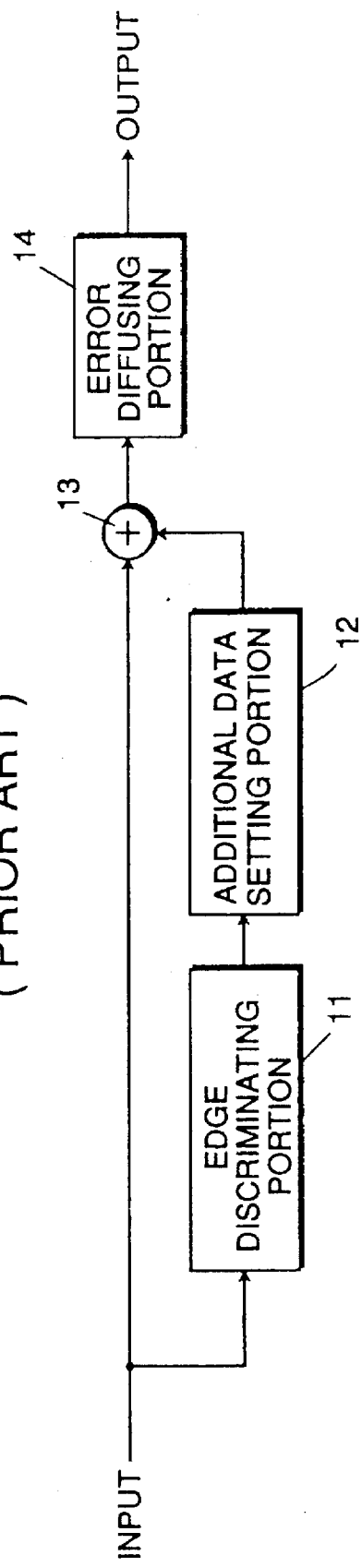
FIGS. 2A, 2B, 2C and 2D are construction views of a conventional edge discriminating method.
Figure 2B:
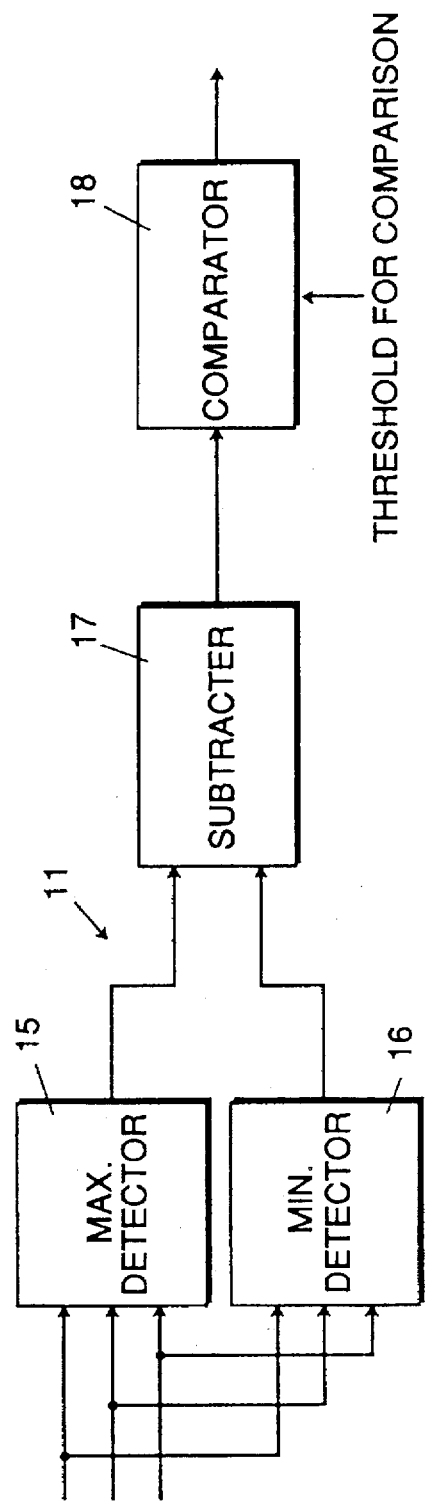
Figures 2C, 2D:
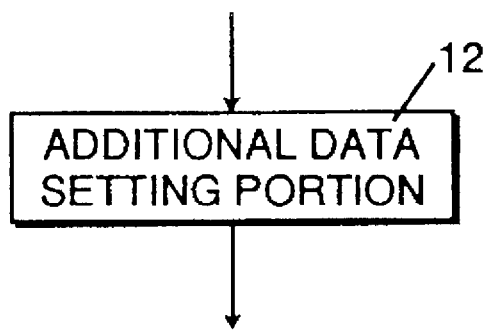

FIGS. 2A to 2D are views for explaining a conventional edge discriminating method: FIG. 2A shows a general construction view of an edge discriminating device; FIG. 2B is a construction view of an edge discriminating portion; FIG. 2C is a view of an additional data setting portion; FIG. 2D is a view of a mask of 3×3 pixels. This conventional method discriminates edge portions within an image and converts data of the image in such a way as to enhance the characters and smoothly change the gradation of a half-tone image portion.

As shown in FIG. 2A, before gray-level image processing, input data is subjected to edge discrimination for an attentional pixel E in the mask data shown in FIG. 2D. If at this stage the input data suggests an edge, it is provided with additional data for preventing the data from being binarized as 0.

In the conventional processing of gray-level images, quantized image data is directly printed out. For instance, image data input as digital information includes pixels each having a gray-level in the range of, e.g., 0 to 255. This means that a stream of 8 bits is required to represent each pixel having a gray-level in the range of 0 to 255 if no additional processing is done. A tremendous memory capacity may be required to store whole image data. In addition, there must be a printer which is capable of reproducing images of gray-levels that vary from 0 to 255.

The present invention provides an image processing device to reproduce scanned images of the gray-level described by generally available printers having a low memory capacity and relatively low power for reproducing the gray shades of an image, it is necessary to reduce the amount of information carried by a pixel and to decrease the number of gray shades of each pixel.

Figure 3:
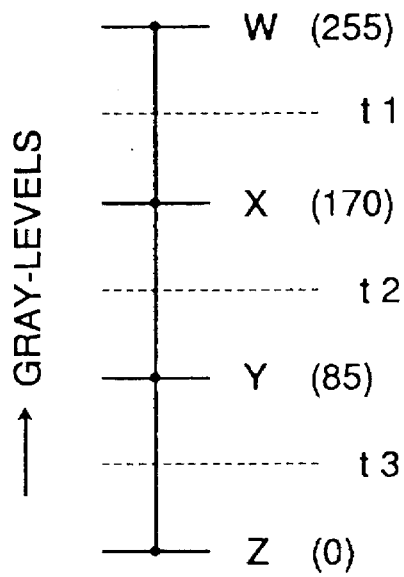
FIG. 3 shows a conventional quantizing procedure.

The processing procedure begins with the reading image data having gray-levels of pixels from 0 to 255. As shown in FIG. 3, the read-in data is quantized for gray-levels of 0 to 255.

For instance, the gray levels (0 to 255) of the data are quantized at points W, X, Y and Z shown in FIG. 3. The quantization is made for discriminating input data "f" with reference to the preset threshold values t1, t2 and t3 as follows:

W if $255 \geq f > t1$;

X if $t1 \geq f > t2$;

Y if $t2 \geq f > t3$;

Z if $t3 \geq f \geq t0$.

Figure 4:
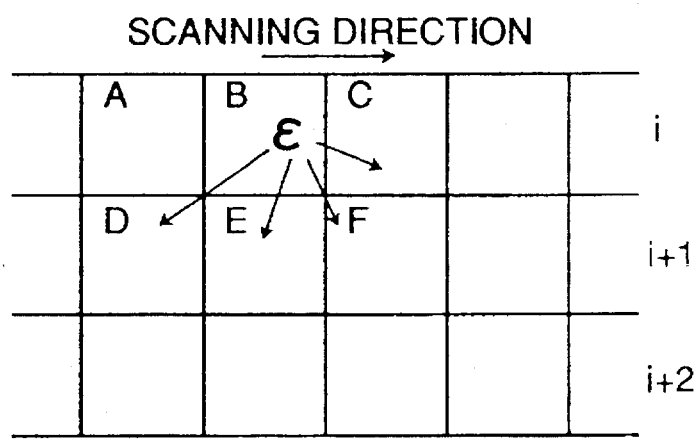
FIG. 4 is a conventional gray-level reserving method.

However, each set of data only quantized may not faithfully represent the gray-levels of local portions on the original, resulting therefore in lacking smoothness of representation of the image. To eliminate the above-mentioned local defect as shown in FIG. 4, the difference between the gray-levels of the image and of the original which occurred in the quantization process, is detected as an error that is processed to give an effect to the gray-levels of the pixels around an attentional one. The gray-levels in the detail of the original image can be more convincingly represented by the processed, quantized image data.

Figure 5:
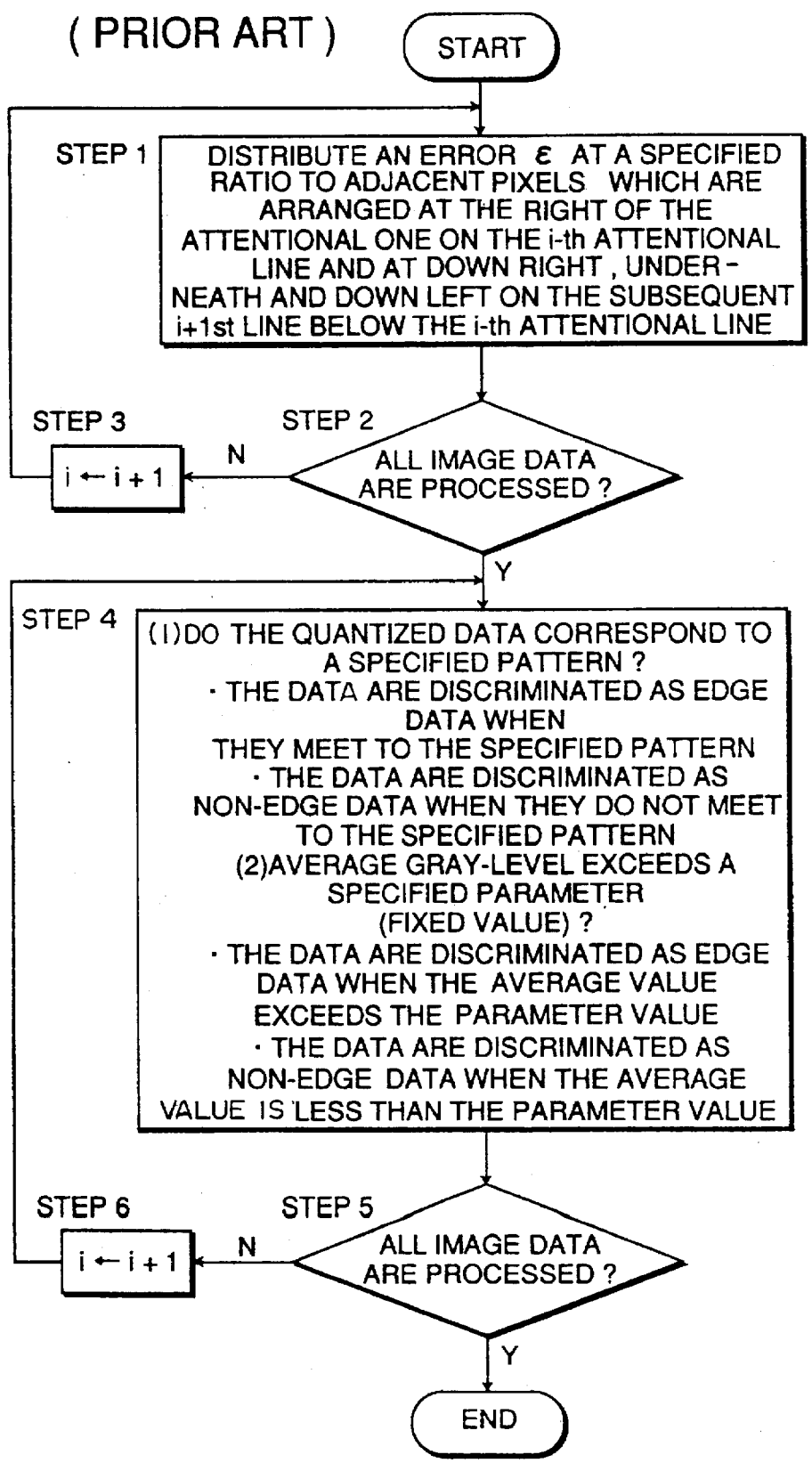
FIG. 5 is a flow chart for explaining a conventional method for edge discrimination.

FIG. 5 is a flow chart for explaining a conventional method for processing a gray-level image. FIG. 4 shows pixels A to F around an attentional one. The first step detects an error ε at an attentional pixel and distributes it in a specified ratio to the adjacent pixels which are arranged at the right C of the attentional one B on the i-th attentional line and down to the right F, underneath E and down to the left D on the subsequent i+1st line below the i-th attentional line. The second step examines whether all image data is processed or not. If all data has not been processed, the third step assumes i=i+1 and returns to step 1 to repeat the procedure. When all the data has been processed (as the second step) the procedure continues to the fourth step. The fourth step performs the following substeps:

(1) The quantized data is checked as to whether it corresponds to a specific pattern or not: the data is judged as edge data when it fits the pattern or as non-edge data when it fails to fit the pattern; and (2) The average gray-level is checked as to whether it exceeds a specified parameter (a fixed value) or not: the data is discriminated as the edge data when the average value exceeds the parameter value or as non-edge data when the average value is less than the parameter value.

The fifth step checks whether all image data is processed or not. The procedure is finished when all the data has been processed or it assumes the equation i=i+1 (at the sixth step) and then the procedure reverts back to the fourth step.

For instance, conventional edge discrimination is achieved by quantizing input data from an image scanner through a gray-level recording circuit and by checking whether the quantized data relates to an edge or a non-edge portion. Furthermore, parameters used for detecting an edge within an image have fixed values experimentally obtained. Another method is the so called pattern matching method that checks whether input data match with two or more specified patterns which have been experimentally determined as possible edge patterns.

Figure 6A:
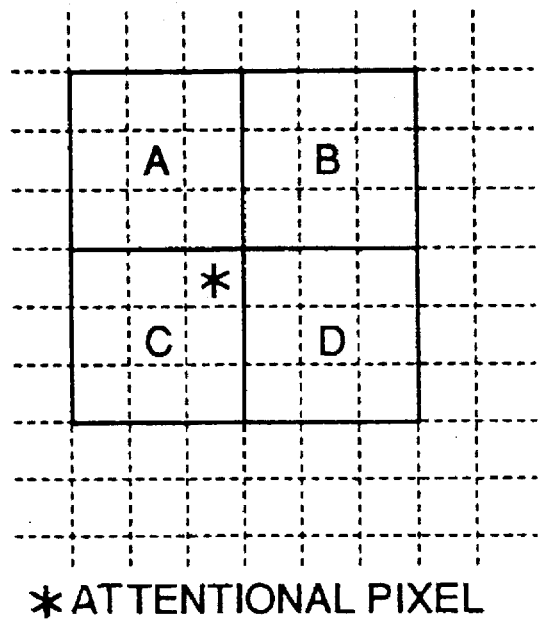
FIGS. 6A and 6B are views of a conventional method of gray-level conversion.
Figure 6B:
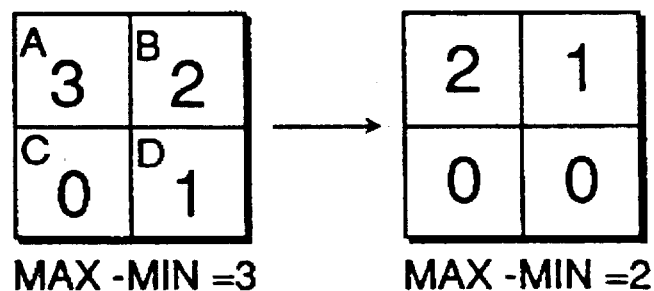

Conventionally, the differences in average gray-levels of, for example, 4 regions A, B, C, D shown in FIGS. 6A and 6B, are used as parameters for edge discrimination. FIG. 6B shows an example of gray level conversion: gray-levels of a left portion are converted into those of a right portion.

Figures 7, 8:
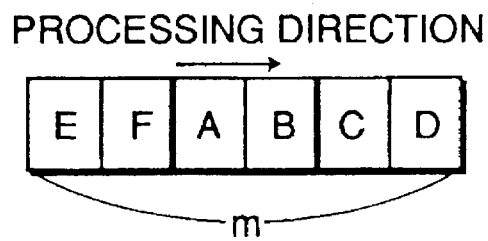
FIG. 7 shows a discriminating region surrounding an attentional pixel according to a conventional image processing method.
FIG. 8 is a view showing a conventional edge discriminating pattern.
Figure 9:
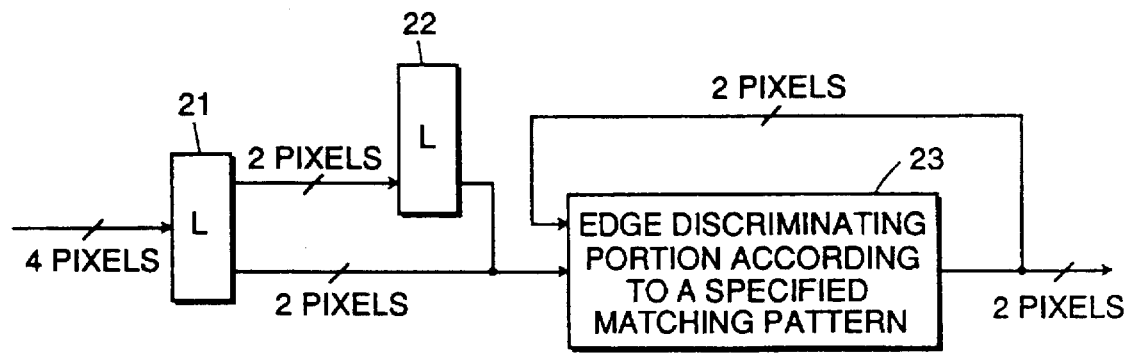
FIG. 9 is a construction view of a conventional edge discrimination.

Regions A to F shown in FIG. 7, patterns which are discriminated as an edge, for example, as shown in FIG. 8, are previously stored in a read only memory (ROM) or a random access memory (RAM) and are used for the edge discrimination of the quantized data of an image. In FIG. 9, input data is processed by two pixels in the processing direction as shown in FIG. 7. In this case the quantity of quantized values is 4. The data of 2 pixels through latch circuits 21 and 22 is transferred to an edge discriminating portion 23 which determines whether the data is of an edge or not. An image on a display screen may be changed over to an objective one for pixel-to-pixel operation according to the results of the above-mentioned edge discrimination.

As mentioned above, a conventional gray-level, image processing circuit is required to detect a specified pattern among 4906 patterns (4 quantized values and 6 pixels require $4^6$ patterns to be checked). As the number of quantized values and pixels increases, the number of patterns increases as well. This makes it more complicated to search for specific patterns that are likely to be an edge. In FIG. 8, there are only 9 specified patterns, but to increase the accuracy rate of edge discrimination, it is necessary to input tens or hundreds of patterns extracted from the 4906 patterns, experimentally considered to be edges. This represents a very complicated operation. Furthermore, only patterns stored in a ROM or a RAM are recognized as edge patterns. Therefore, mistakes in discrimination may arise since memorized patterns are not enough to cover all the possible edge patterns.

As shown in FIG. 1, gray-level conversion is more effective for improving image quality when it is conducted after the edges have been discriminated within the image. However, if an input image, e.g., of faint characters has low gray-levels, the characters cannot be detected as edges by the use of conventional fixed parameters. It is therefore desirable to make patterns vary according to the gray-levels of an image and to selectively use parameters for low gray-level images (to reliably detect edges) and parameters for a high gray-level image (in order not to detect non-edge pixels).

For example, if a pattern having a gray-level difference of not less than 3 is an edge, as shown in FIG. 6(B), is assumed, the difference is reduced to 2 after gray-level conversion and is recognized as a non-edge portion.

In the prior art described in the above-mentioned publication, an edge is coarsely detected from a region of x×z pixels and a mistake in discrimination may take place in a half-tone edge portion. Since the prior art uses a fixed threshold, it is difficult to detect an edge when the image data is processed to have lower gray levels.

On the contrary, when an attentional pixel and m neighbors are examined in place of detecting an edge from a region of x×z pixels and a gradient of gray levels is calculated, an edge portion and a non-edge portion can be discriminated according to the calculated value of gradients of the gray-levels. This allows for detecting edges from the details of the image and to attain a higher accuracy of edge detection. By using a variable threshold it is possible to accurately detect edges even in a faint image which is processed to have lowered gray-levels.

Figure 10:
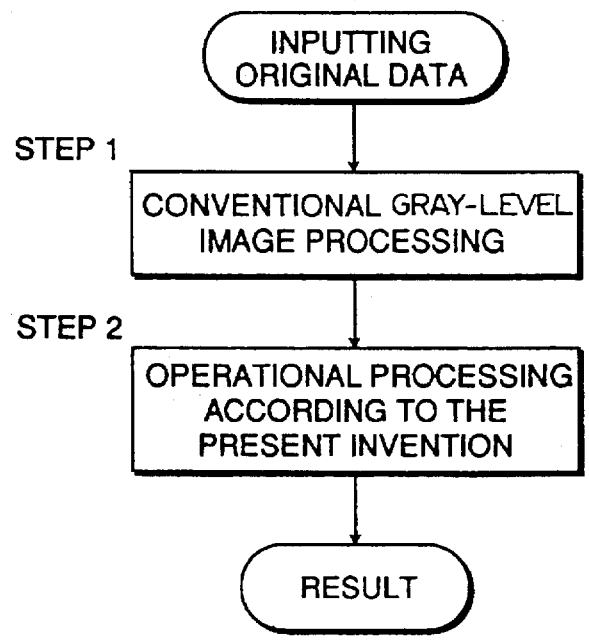
FIG. 10 is a flow chart for explaining a position of a printable data converting system according to the present invention.

Referring now to the accompanying drawings, preferred embodiments of the present invention will be described in detail as follows:

FIG. 10 is a flow chart for explaining the location of a printable data conversion system in a gray-level image-processing device according to the present invention. This system comprises conventional gray-level image processing (step 1) and edge discrimination processing (step 2) according to the present invention.

Figure 11:
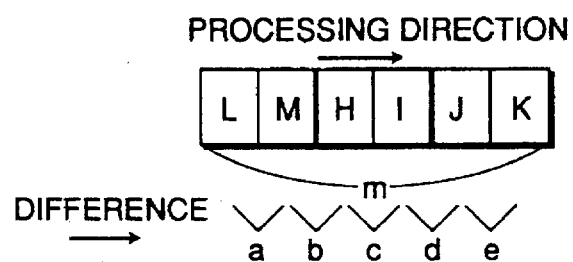
FIG. 11 shows a discriminating region around an attentional pixel according to the present invention.

Input data quantized by conventional gray-level image-processing is classified into 4 quantized values W, X, Y and Z for gray-levels of 0 to 255. These quantized values are processed first by operating in the processing (horizontal scanning) direction at a constant interval as follows:

In FIG. 11, H and I are assumed as attentional pixels and these two pixels are examined as to whether they correspond to an edge portion of the image or not. When all the pixels (L, M, H, I, J, K) shown in FIG. 11 conform with a specified gray-level difference (gray-level curve), they are judged to be an edge within the image. In all other cases the pixels are judged to be of a non-edge portion of the image.

Figure 12:
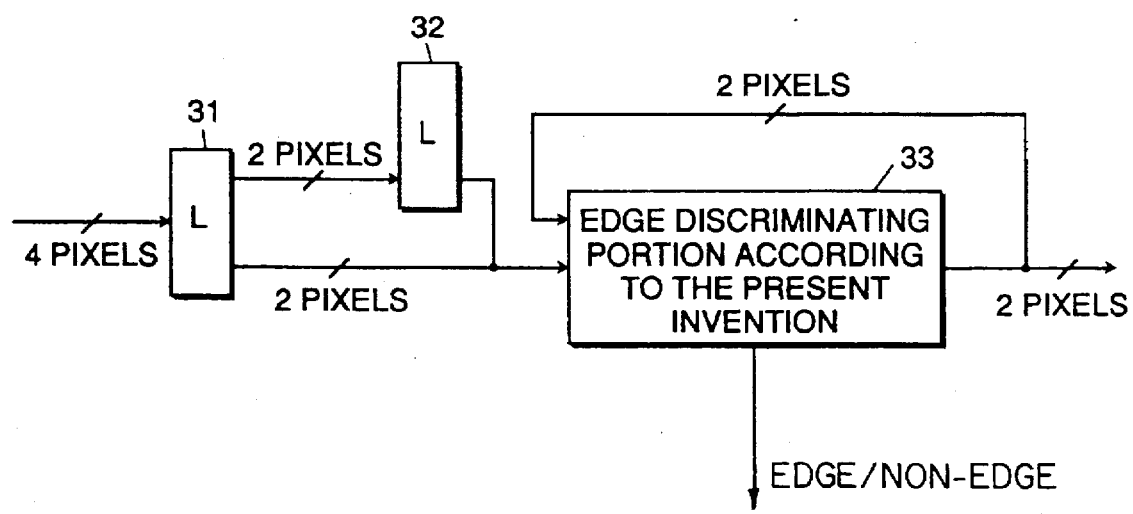
FIG. 12 is a view for explaining an image processing device embodied in the present invention.

FIG. 12 is a block diagram showing an example of an image processing device according to the present invention, wherein numerals 31 and 32 designate latch circuits and numeral 33 designates an edge-discriminating portion. Input data are quantized by the conventional gray-level image processing (step 1 of FIG. 10) and then they are processed by two pixels at a time in the processing (horizontal scanning) direction shown in FIG. 11. In this case 4 quantized values are applied.

These two pixel data are transferred through the latch circuits 31 and 32 to the edge discriminating portion 33 whereby the data is discriminated as to whether it relates to an edge portion of the image or not. The object image is changed over to an image for the inter-pixel operation according to the result of the edge discrimination, as shown in FIG. 11. For instance, to execute the edge discrimination by two pixels at a time, the latch circuits 31 and 32 serve to divide the data of, e.g., 4 pixels, into the data of 2 pixels and transfer them by two pixels at a time with a specified time delay to the edge discriminating portion 33, which performs the operation on the two-pixel data and outputs it. The output data of two pixels is reentered into the edge discriminating portion 33 to realize the discrimination of 6 pixels. In other words, the edge discrimination operation for attentional pixels H and I is performed using a six-pixel window as illustrated in FIG. 11

Figure 13:
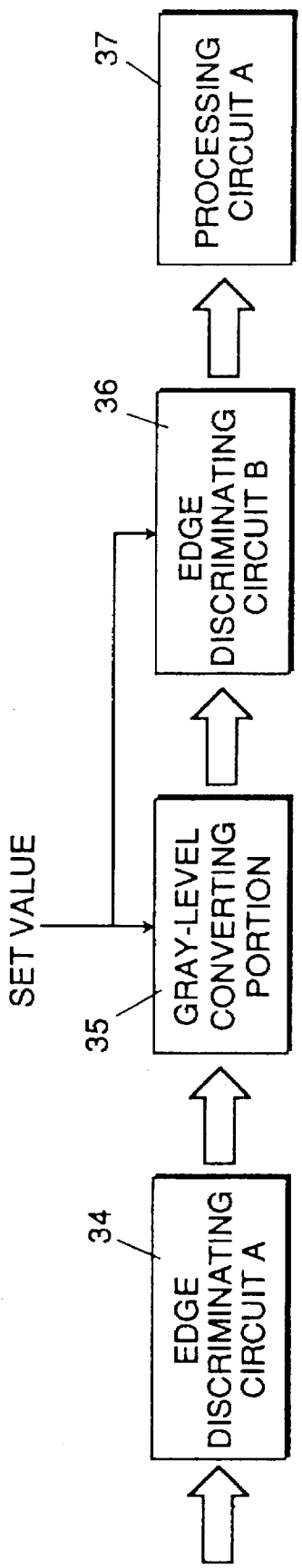
FIG. 13 is a block diagram 1 of gray-level setting to be conducted by a gray-level converting portion and by an edge-discriminating portion according to the present invention.
Figure 14:
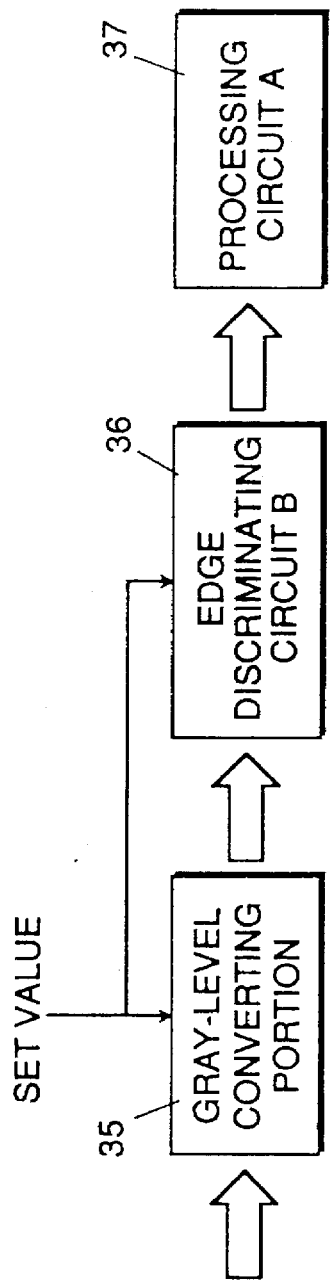
FIG. 14 is a block diagram 2 of a gray-level setting to be conducted by a gray-level converting portion and by an edge discriminating portion according to the present invention.

FIGS. 13 and 14 are block diagrams showing edge discriminating systems according to the present invention, wherein 34 is an edge discriminating circuit A, 35 is a gray-level converting portion, 36 is an edge discriminating circuit B, and 37 is a processing circuit A. FIG. 13 indicates a first method and FIG. 14 indicates a second method, according to the present invention. In FIG. 13, the edge discriminating circuit 34 first discriminates an edge portion of an image and the gray-level converting portion 35 conducts a gray-level conversion of the image, determining a set value (change over value of a gray-level). The edge discriminating circuit 36 carries edge out discrimination for the image again. The edge discriminating circuit 36 can also specify the set value of the gray-level. The processing circuit 37 performs image processing.

The second method shown in FIG. 14 differs from the first method only by lacking the edge discriminating circuit 34 of FIG. 13. In other words, both methods of FIGS. 13 and 14 are devised to specify a set value of a gray-level to the edge discriminating circuit 36, eliminating the problem of the conventional method shown in FIG. 1 wherein an edge cannot easily be discriminated in some cases.

Figure 15A:
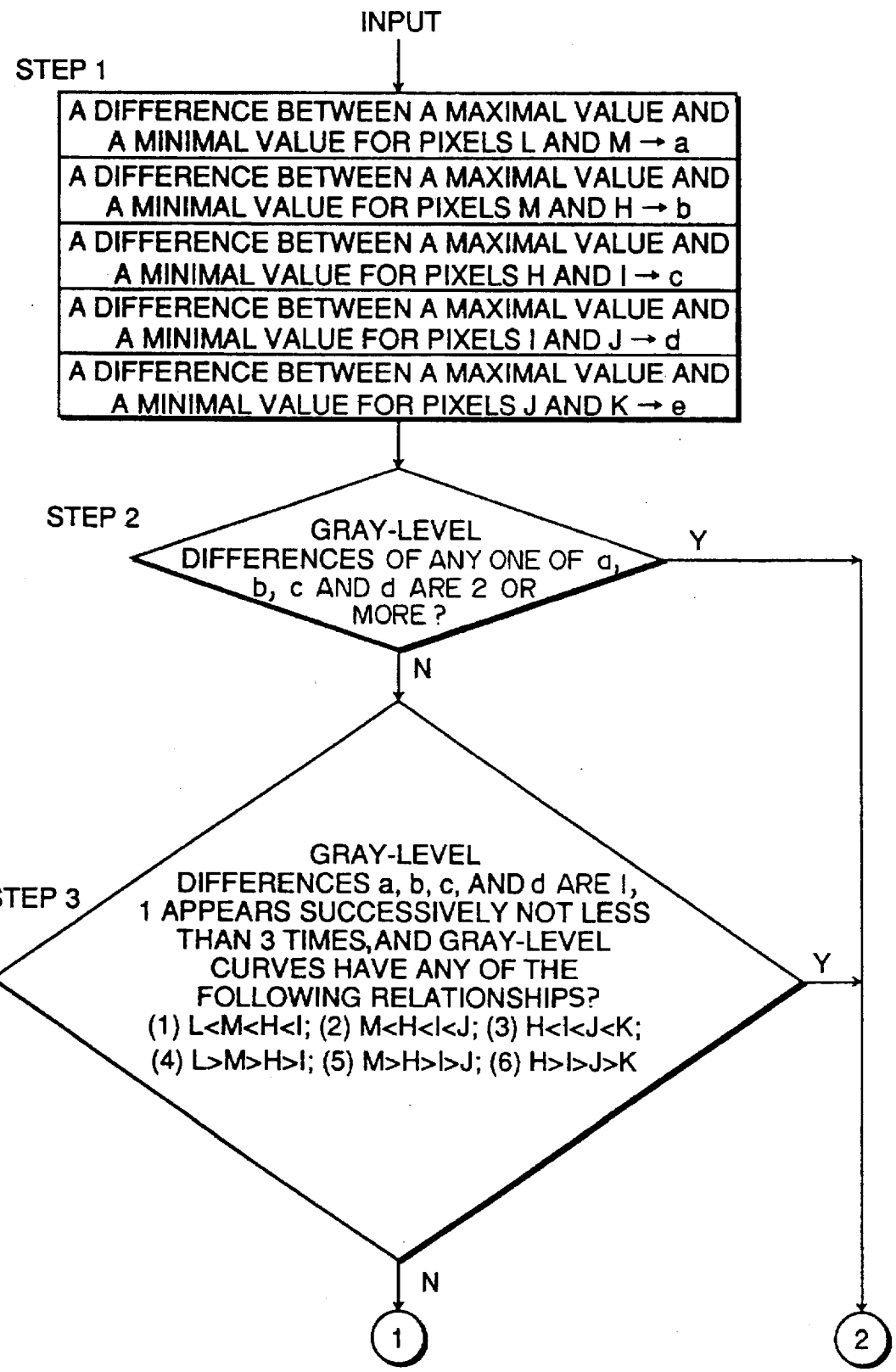
FIGS. 15A and 15B are flow charts for explaining how to discriminate an edge according to a gradient of gray levels corresponding to those of the present invention.
Figure 15B:
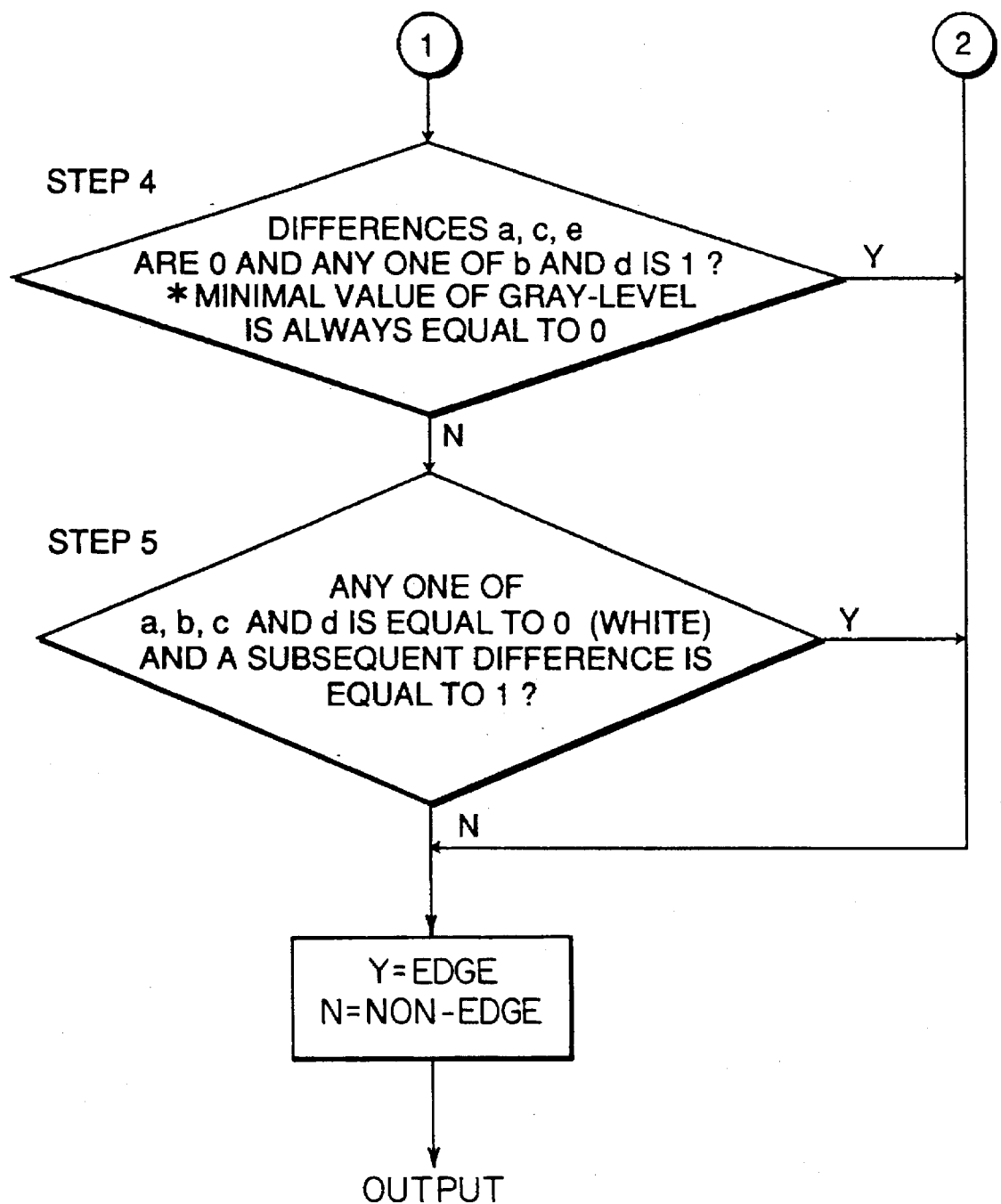

FIGS. 15A and 15B are flow charts of edge discrimination processing according to the present invention, which includes the following steps to be explained below. FIG. 16 is a comparison table showing the results of edge discrimination by a method according to the present invention and by a conventional method. Edges No. 01, 09 and 01 for the conventional method in FIG. 16 correspond to edges No. 01 and 09 shown in FIG. 8. FIGS. 17A to 17I are views for explaining the results of edge discrimination according to the present invention, which correspond to the results No. I to IX respectively in FIG. 16. The operation will be explained with regard to FIGS. 15A and 15B as follows:

Step 1: Gray-level sensor senses gray-levels of an image on a pixel-by-pixel basis, and then the operational device generates a signal of the difference between two adjacent pixels. It calculates a difference "a" between a maximal value and a minimal value for pixels L and M, a difference "b" between a maximal value and a minimal value for pixels M and H, a difference "c" between a maximal value and a minimal value for pixels H and I, a difference "d" between a maximal value and a minimal value for pixels I and J and a difference "e" between a maximal value and a minimal value for pixels J and K.

Step 2: Gray-level gradient discriminating device examines whether each of the gray-level differences "a", "b", "c" and "d" is not less than 2. Edge discriminating device judges the pixels as being of an edge portion if any of "a", "b", "c", or "d" is greater than or equal to 2. This case corresponds to input data No. IV of FIG. 16 and FIG. 17D to be described later.

Step 3: Perform the following operations when the gray-level differences are less than 2 (at step 2). It discriminates whether gray-level differences "a", "b", "c" and "d" are 1, 1 appears successively and not less than 3 times, and gray-level curves have any of the following relationships:

The minimal value shall always be 0 (white level). The pixels are discriminated to be an edge portion of the image if the gray-level curves correspond to any one of above-described relationships. This corresponds to input data No. I, II and III shown in FIGS. 16 and 17A, 17B, 17C.

Step 4: If the gray-level curves do not correspond to the above-mentioned relationships (at step 3), check whether the gray-level differences "a", "c" and "e" are equal to zero (0) and one of the gray-level differences "b" and "d" is equal to 1 or not. When both the above-mentioned conditions are satisfied, the pixels are discriminated to be of an edge portion. This corresponds to input data No. VII shown in FIGS. 16 and 17G.

Step 5: If discrimination at step 4 is <No>, check whether any one of the differences "a", "c" and "e" are equal to zero (0) and the subsequent gray-level differences are equal to 1 or not. When both the above-mentioned conditions are satisfied, the pixels are discriminated to be of an edge portion. This corresponds to input data No. V and VI shown in FIGS. 16 No. 5, 6 and 17E, 17F. If not, the pixels are discriminated to be of a non-edge portion of the image.

For instance, pixels L, M, H, I, J and K are subjected one by one to the determination of a difference of gray-levels between two subsequent pixels. If the difference for any pixel pair is very large (i.e., 2 or more for 4 quantized values of gray levels), the pixels are judged to be of an edge portion of the image (at the second step).

If the gray-level differences are stable at 1 and form a linear curve of gray-levels in an ascending order (0 (white), 1, 2 . . . ) or in a descending order, the pixels are judged to be of an edge portion (at the third step). In this case, a minimal value shall be equal to 0 (white). While 4 pixels are arranged in descending order in a flow chart shown in FIGS. 15A and 15B, 3 pixels in descending order are also admitted (this may depend upon the quantity of quantized values and the quantity of pixels for edge discrimination).

When the gray-level differences "a", "c" and "e" are equal to 0 and one of the gray-level differences is equal to 1, the pixels are judged to be of an edge portion (at the fourth step).

In this case, a minimal value shall be equal to 0 (white). Finally, when any one of the gray-level differences "a", "b", "c" and "d" is equal to 0 and a pixel for operation has a gray level of 0 (white) and differs in its gray-level by 1 from a preceding pixel and a subsequent pixel, the pixel is judged to be of an edge portion. If the above-mentioned conditions are not satisfied, the pixel is judged to be of a non-edge portion (at the fifth step).

Figure 18:
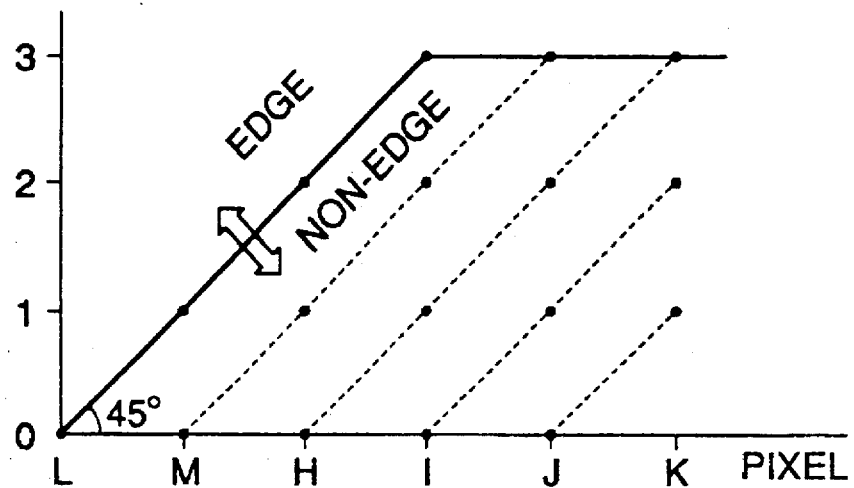
FIG. 18 is a view showing edge discrimination by the method shown in FIG. 15.

FIG. 18 shows the relationship between an edge portion and a non-edge portion to be discriminated by the above-mentioned method, wherein the horizontal axis indicates the location of pixels to be checked and the vertical axis indicates quantized values obtained by a gray-level image processing portion. A line starting from a point on the horizontal axis (gray-level of 0 (white)) and drawn right upward at an angle of 45° from the horizontal axis serves as a reference line. A pixel having a gray-level curve lying above the reference line is considered to be of an edge portion, while a pixel having a gray-level curve lying under the reference line is considered to be of a non-edge portion.

Figure 17A:
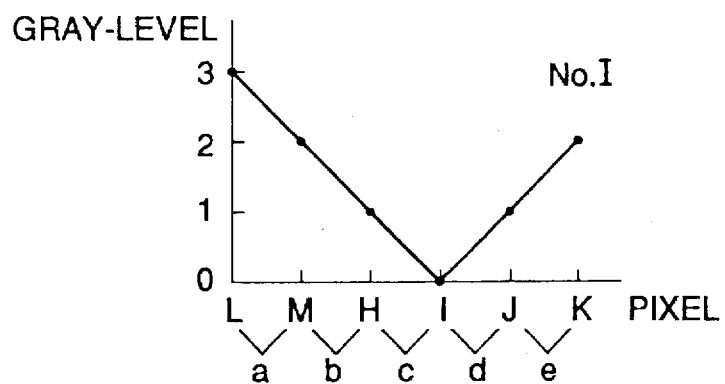
FIGS. 17A to 17I are comparison views (2) for comparing the results of edge discrimination according to the present invention with those according to the prior art.
Figure 17B:
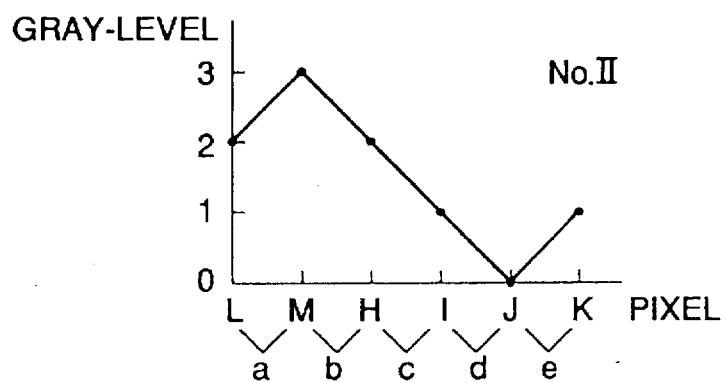
Figure 17C:
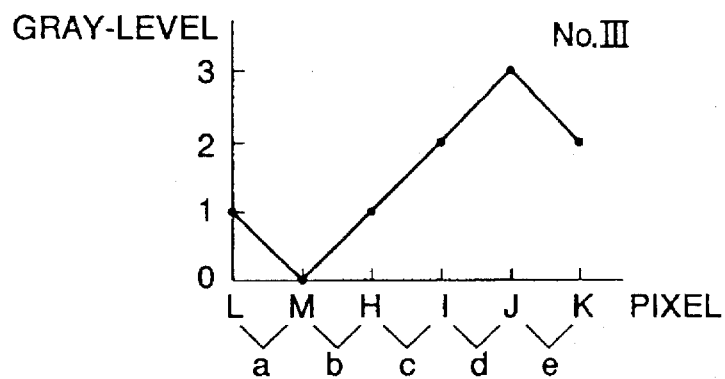
Figure 17D:
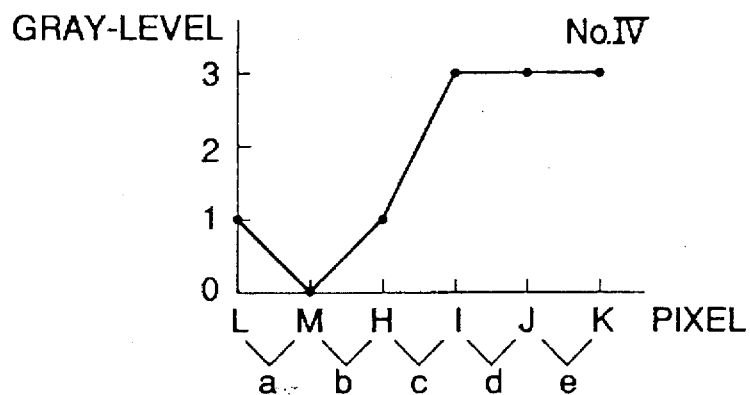
Figure 17E:
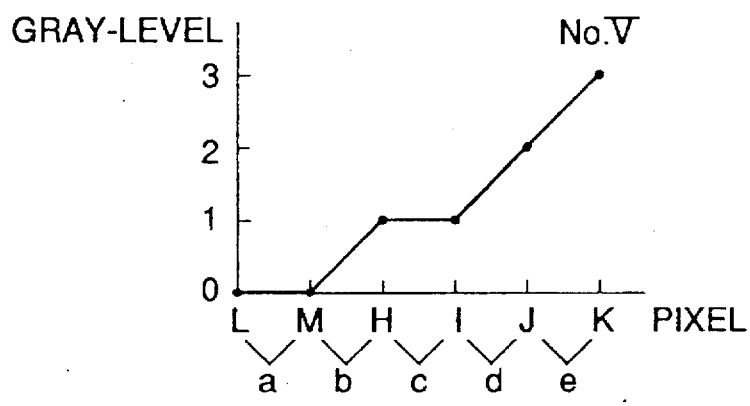
Figure 17F:
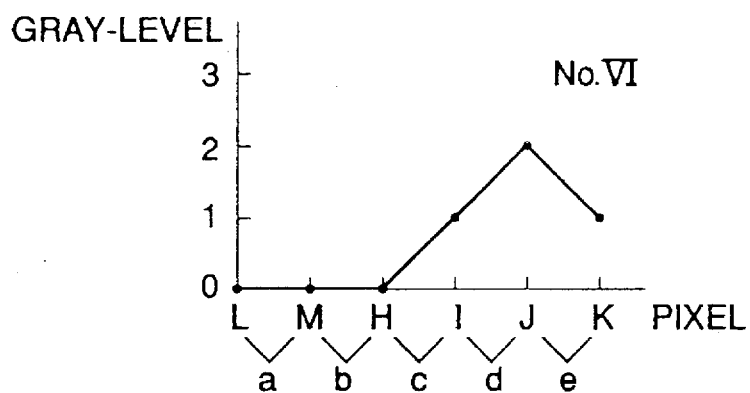
Figure 17G:
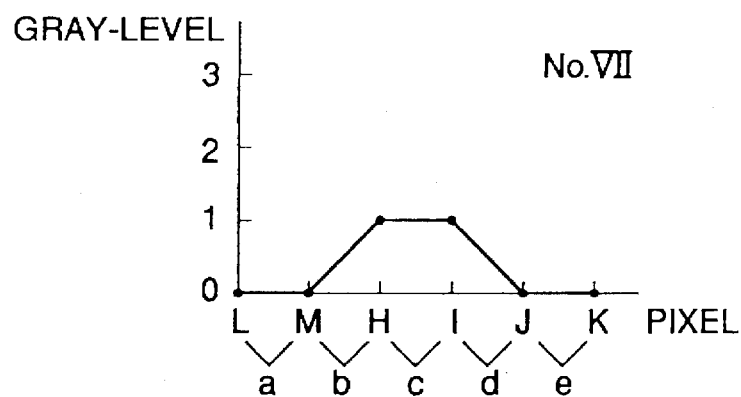
Figure 17H:
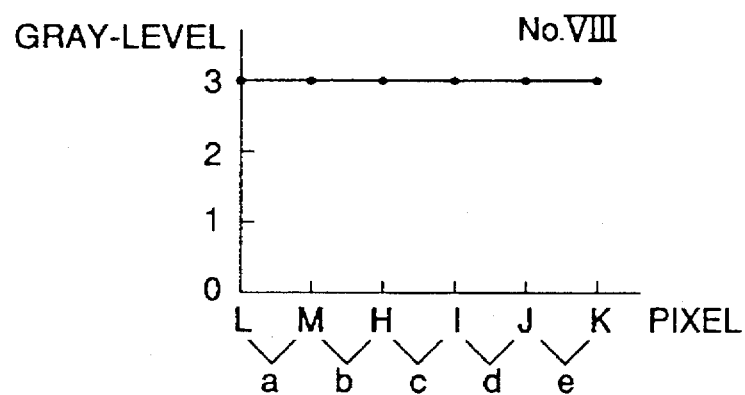
Figure 17:
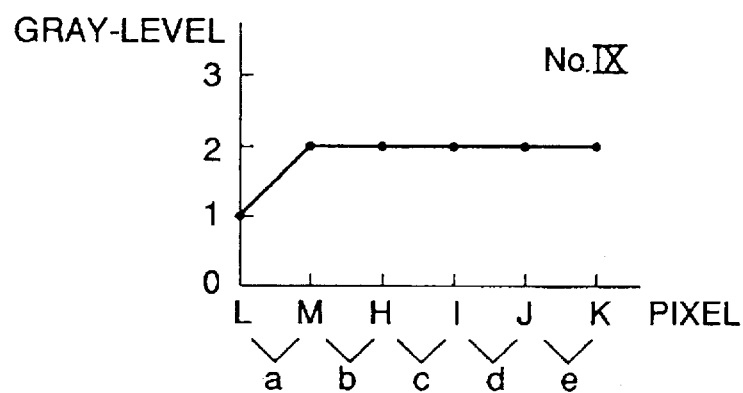

As mentioned above, referring to FIGS. 16 and 17, edge discrimination of the input image data is done by the conventional method and the above-mentioned method, of the present invention, to compare both methods. Graphs represent the input image data processed by the method according to the present invention.

The method according to the present invention can discriminate input data Nos. I, II, III and IV as data of the edge portions while the conventional method judges them as data of non-edge portions. This indicates a higher degree of accuracy for the present method.

The edge-discriminating method, according to the present invention, assures a high accuracy of edge detection, eliminating the possibility of mis-judgement due to the insufficiency of edge discriminating conditions and requiring no complicated operations for increasing the accuracy.

Although in the shown embodiment data is scanned only in the horizontal, processing direction, it may be scanned in the vertical feeding direction as well. Multi-valued quantization other than 4-valued quantization is also applicable.

Figure 19:
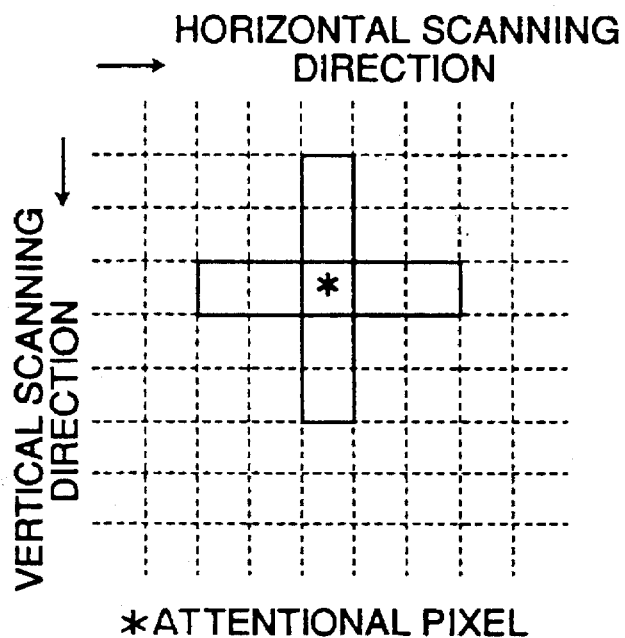
FIG. 19 shows a region of edge discrimination for explaining another example of an image processing device according to the present invention.
Figure 20:
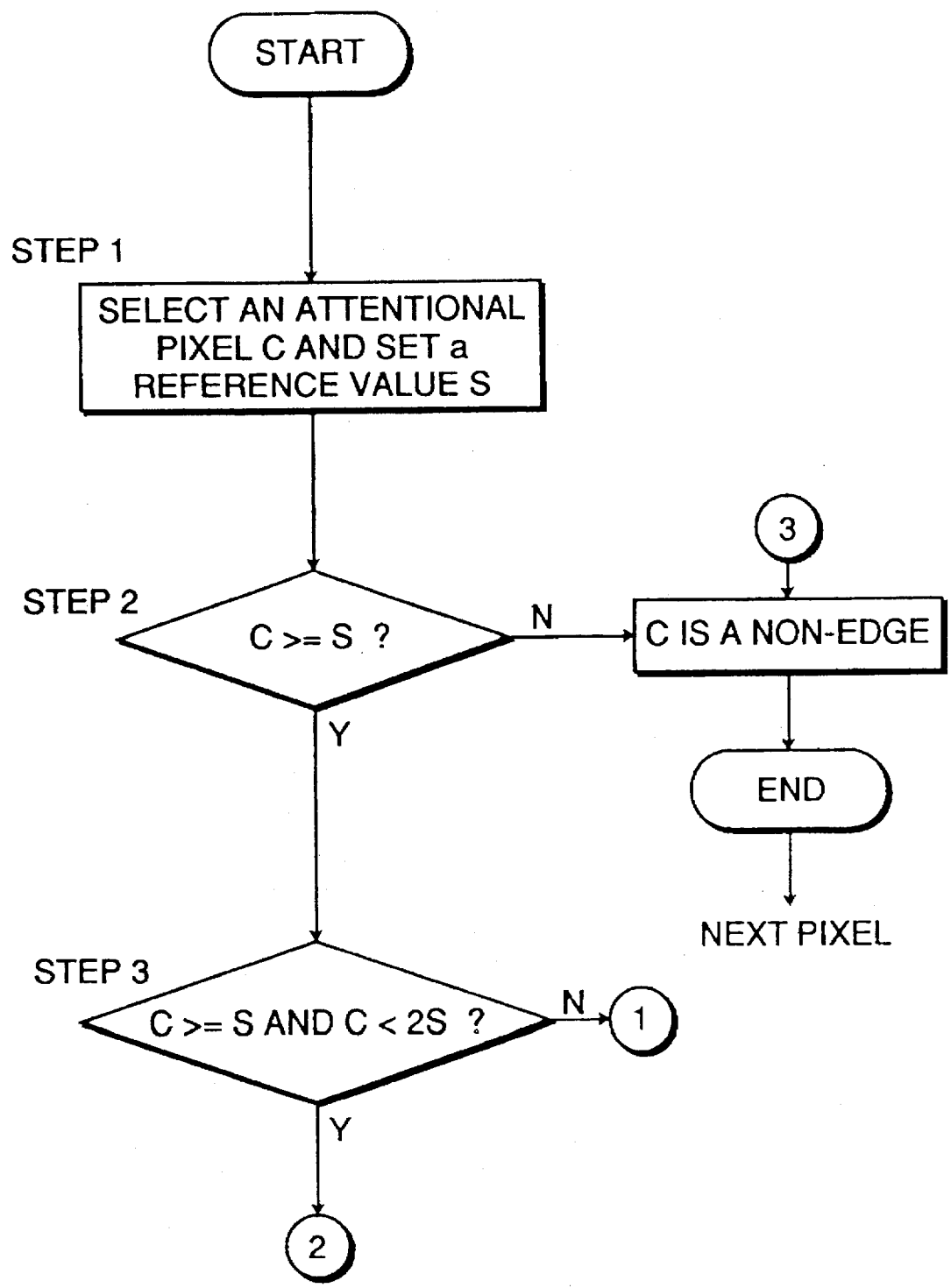
FIG. 20 is a flow chart (1) for explaining how to set parameters for edge discrimination depending on the gray-levels of an image according to the present invention.

Another image processing device, according to the present invention, will be described as follows:

Referring to FIG. 19, an attentional pixel together with two right and left adjoining ones and two upper and lower adjoining ones are selected for edge discrimination.

An edge gradient is determined from the selected pixels' condition according to the following procedure.

FIGS. 20 to 23 are flow charts for determining an edge gradient as follows:

Step 1: Select an attentional pixel C and determine the reference value S for calculating an edge gradient.

Step 2: Examine whether the attentional pixel C is >=S or not. If C>=S, the operation proceeds to Step 3. If C is not >=S, C is judged as a non-edge element, and the processing is finished. Then a subsequent pixel is selected (Step 1).

Figure 21:
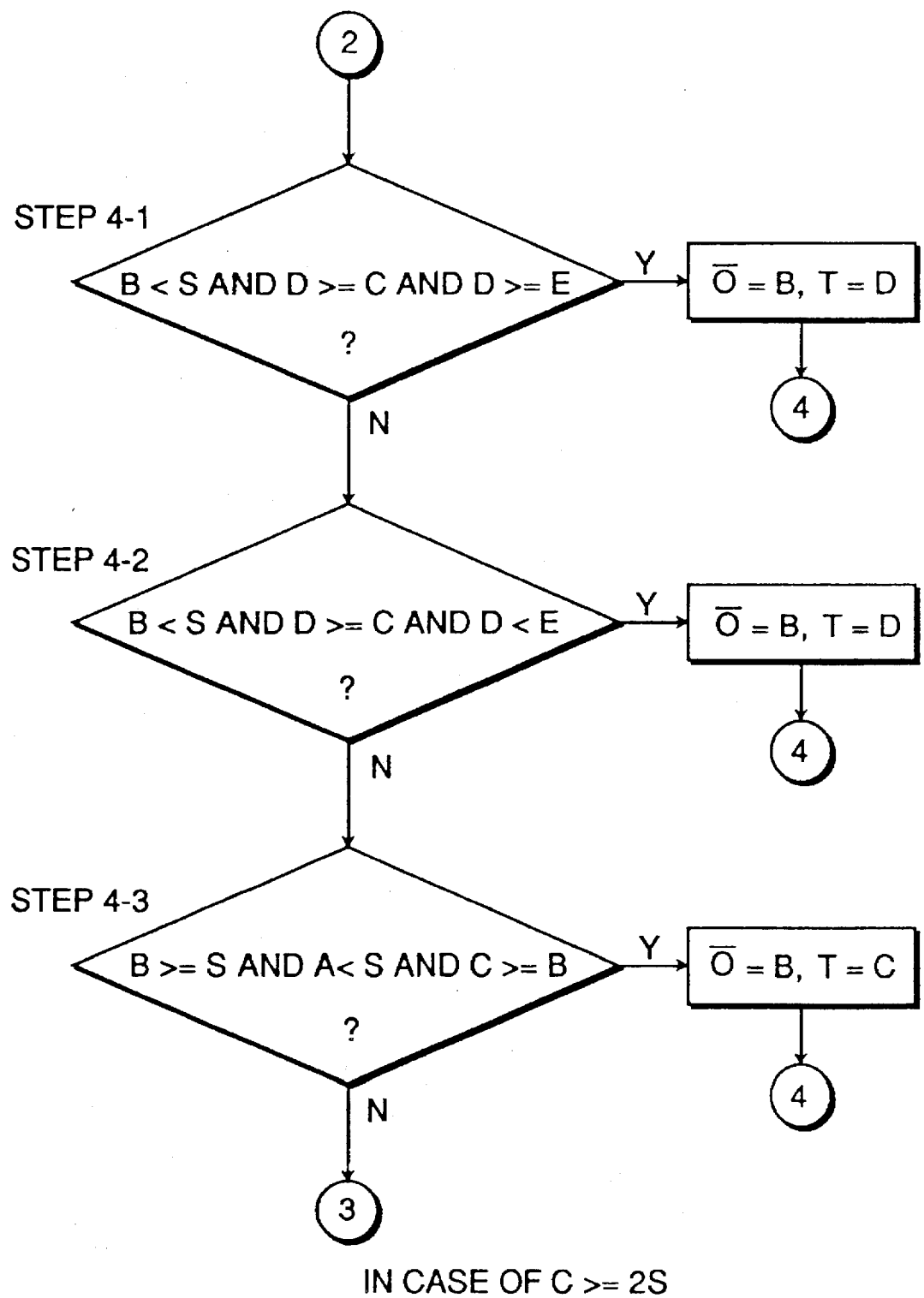
FIG. 21 is a flow chart (2) for explaining how to set parameters for edge discrimination depending on the gray-levels of an image according to the present invention.
Figure 22:
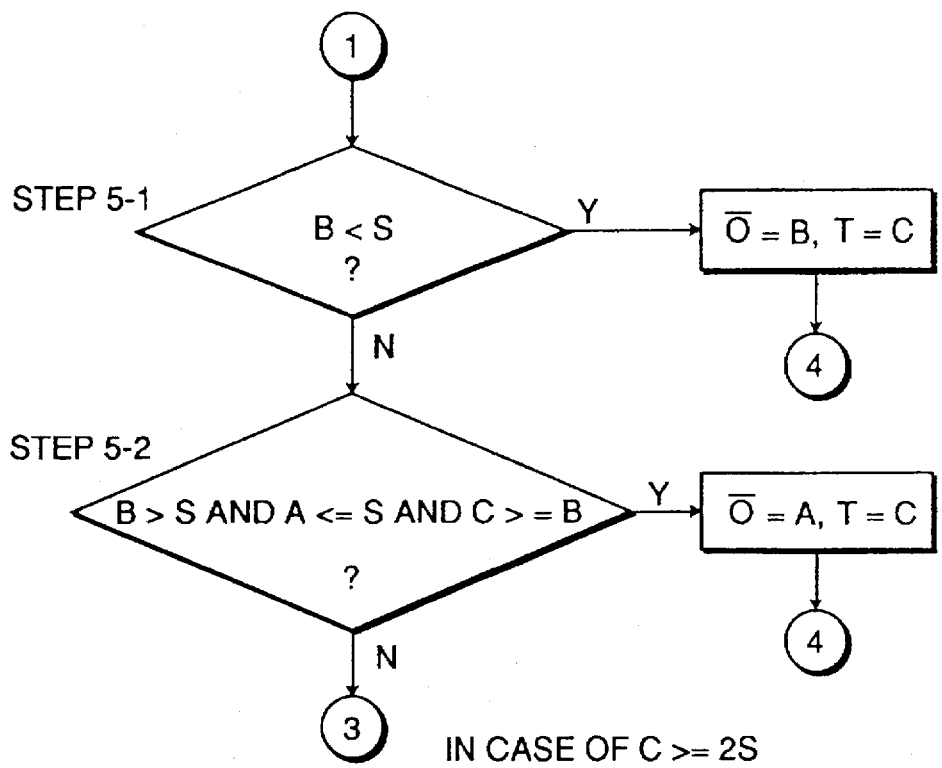
FIG. 22 is a flow chart (3) for explaining how to set parameters for edge discrimination depending on the gray-levels of an image according to the present invention.
Figure 23:
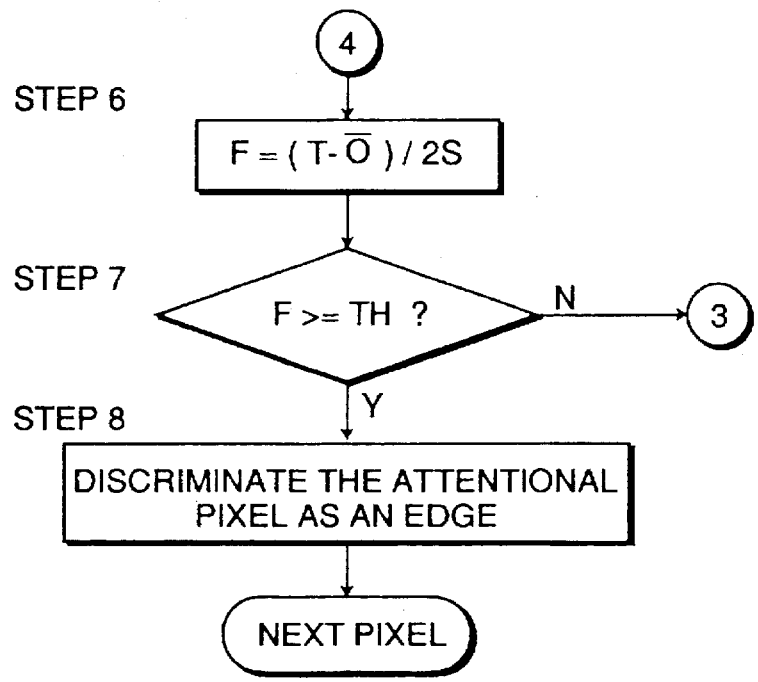
FIG. 23 is a flow chart (4) for explaining how to set parameters for edge discrimination depending on the gray-levels of an image according to the present invention.

Step 3: Check whether the attentional pixel C is >=S and <2S or not. If the result is <Yes>, subsequent steps 4-1 to 4-3 will be executed as shown in FIG. 21. Pixels A, B, D and E neighboring to the attentional pixel C are shown in FIG. 7.

Step 4-1: If B<S, D>=C and D>=E, a reference point 0 is equal to point B (i.e., 0=B) and a maximal point is equal to point D (i.e., T=D), the operation proceeds to Step 6.

Step 4-2: If B<S, D>=C and D<E, the reference point 0 is equal to point B (i.e., 0=B) and the maximal point is equal to point D (i.e., T=D), the operation proceeds to Step 6.

Step 4-3: If B>=S, A<S and C>=B, the reference point 0 is equal to point B (i.e., 0=B) and a maximal point is equal to point C (i.e., T=C), the operation proceeds to Step 6.

Step 5-1: If the attentional pixel C is >2S at Step 3, check is made whether B is <S or not. If B<S, 0=B and T=C, the operation proceeds to Step 6.

Step 5-2: If B>=S, A<S and C>B, 0=A and T=C, the operation proceeds to Step 6.

Step 6: (T-0)/2S=F is calculated.

Step 7: A check is made whether F is >=TH or not. If the result is <No>, the pixel is judged as a non-edge element.

Step 8; If the result of Step 7 is <Yes>, F is considered as a gradient at point C and the attentional pixel is judged as an edge element.

The above-mentioned processing steps are executed on an attentional pixel with reference to an adjoining left and an adjoining right one and an upper and lower one. The attentional pixel is judged as an edge element when any one of the four discriminations satisfies the edge conditions.

Figure 24:
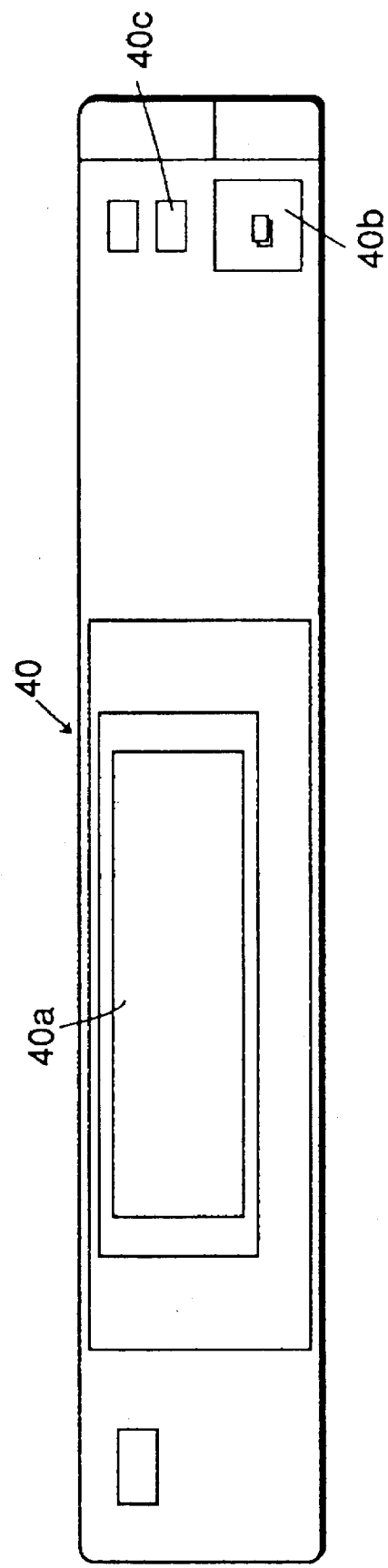
FIG. 24 is a general construction view of a control portion for setting gray-levels of an image according to the present invention.
Figure 25:
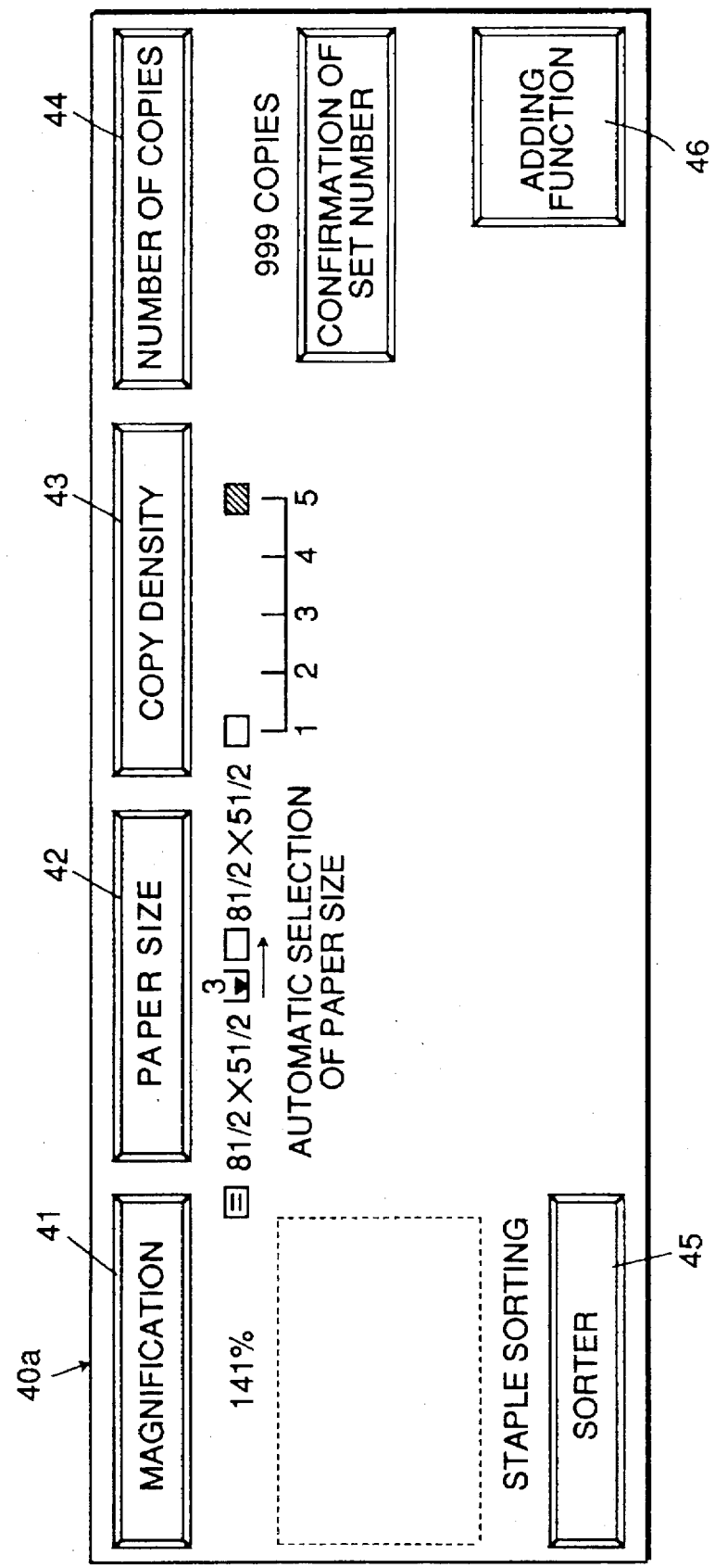
FIG. 25 is a view of a control panel for setting gray-levels of an image according to the present invention.

FIGS. 24 and 25 are construction views of a control portion for setting desired gray levels: FIG. 24 is a general view of the control portion and FIG. 25 is a view of a control panel. In these drawings, 40 is a control portion, 40a is a control panel, 40b is a printing switch, 40c is an image selector switch, 41 is a magnification setter, 42 is a paper size selector, 43 is a copy density controller, 44 is a copy number setter, 45 is a sorting controller and 46 is an adding function controller.

A desired gray level of an image is set from the control portion shown in FIG. 25. In the gray-level converting portion shown in FIGS. 13 and 14, gray-levels of an image can be changed, for example, at five steps on the conditions shown in FIG. 26.

In short, the processing step 4 changes a reference for edge discrimination by setting F at ½, ⅔, ½, ½ and ¾ and at gray-level set values 1, 2, 3, 4 and 5 respectively. A value TH against a gray-level set value represents a gradient of gray-levels. A center set value 3 corresponds to a gradient of 45° and F=½.

In the shown embodiment, since each pixel may have a gray-level value of 0 to 3, a value F may be reduced to ⅔ and ½ and at a gradient smaller than 45° and, similarly, it is increased to ½ and ¾ at a gradient of more than 45°. The parameter TH is thus determined against each of the set values.

Figures 28, 29:
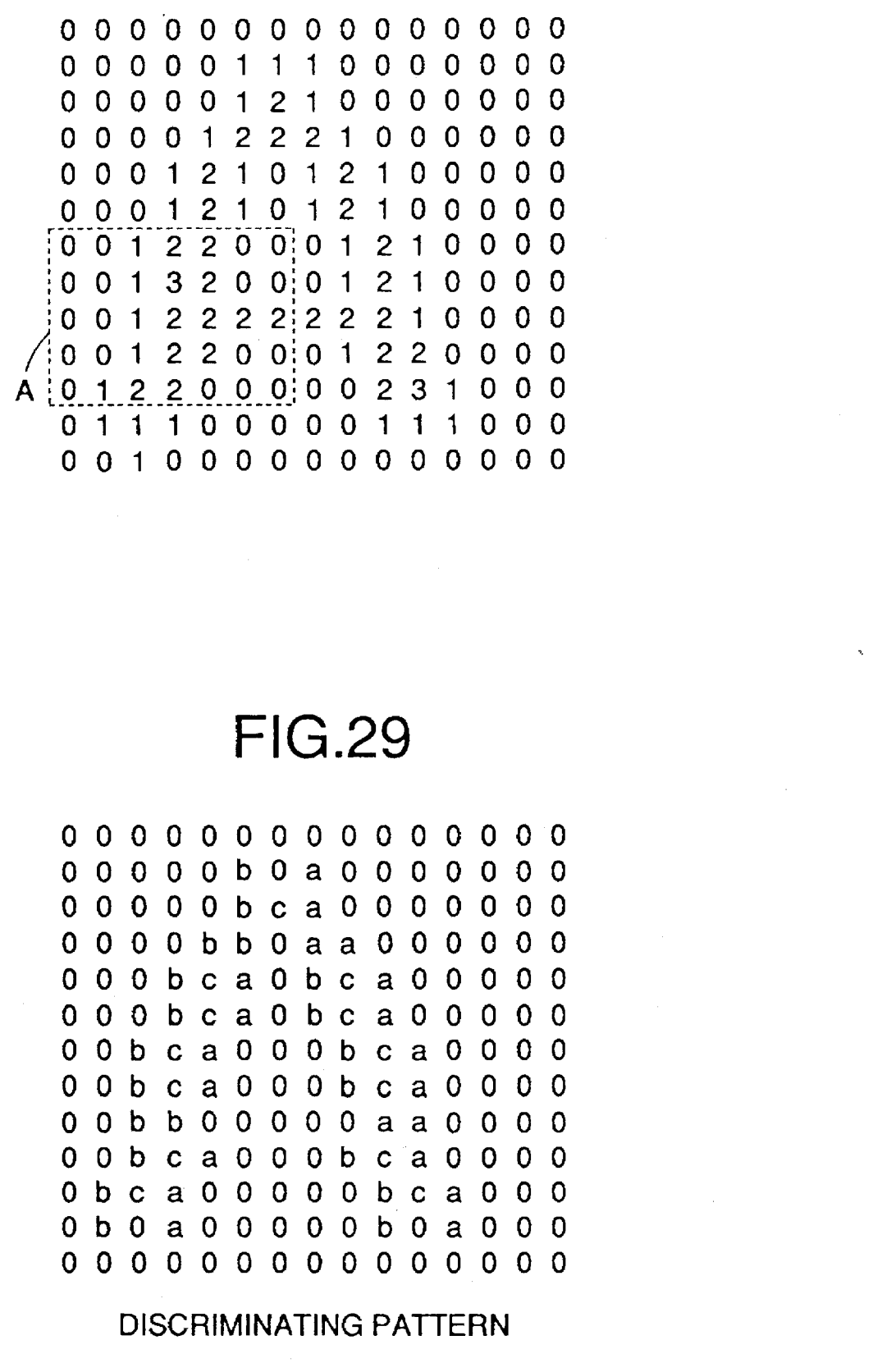

It is assumed that image data is represented by pixels each having a 4-valued gray-level when a gray-level of the image is set at 3. Pixels used for discriminating an attentional pixel are shown in FIG. 28.

In the control portion shown in FIG. 25, an edge discriminating condition, depending upon a set value of gray-levels, is determined according to the table shown in FIG. 26. The edge discriminating condition is such that a pixel is judged as an edge when F>½. The processing for edge discrimination is executed according to the flow charts shown in FIGS. 20 to 23. FIG. 27 depicts a table of patterns used for edge discrimination (only with reference to a left pixel). FIG. 28 indicates original data and FIG. 29 indicates the results of edge discrimination with reference to a right pixel and a left pixel. (o: Non-edge, a: Right referred edge, b: Left referred edge, c: Right/Left referred edge).

Figures 30A, 30B:
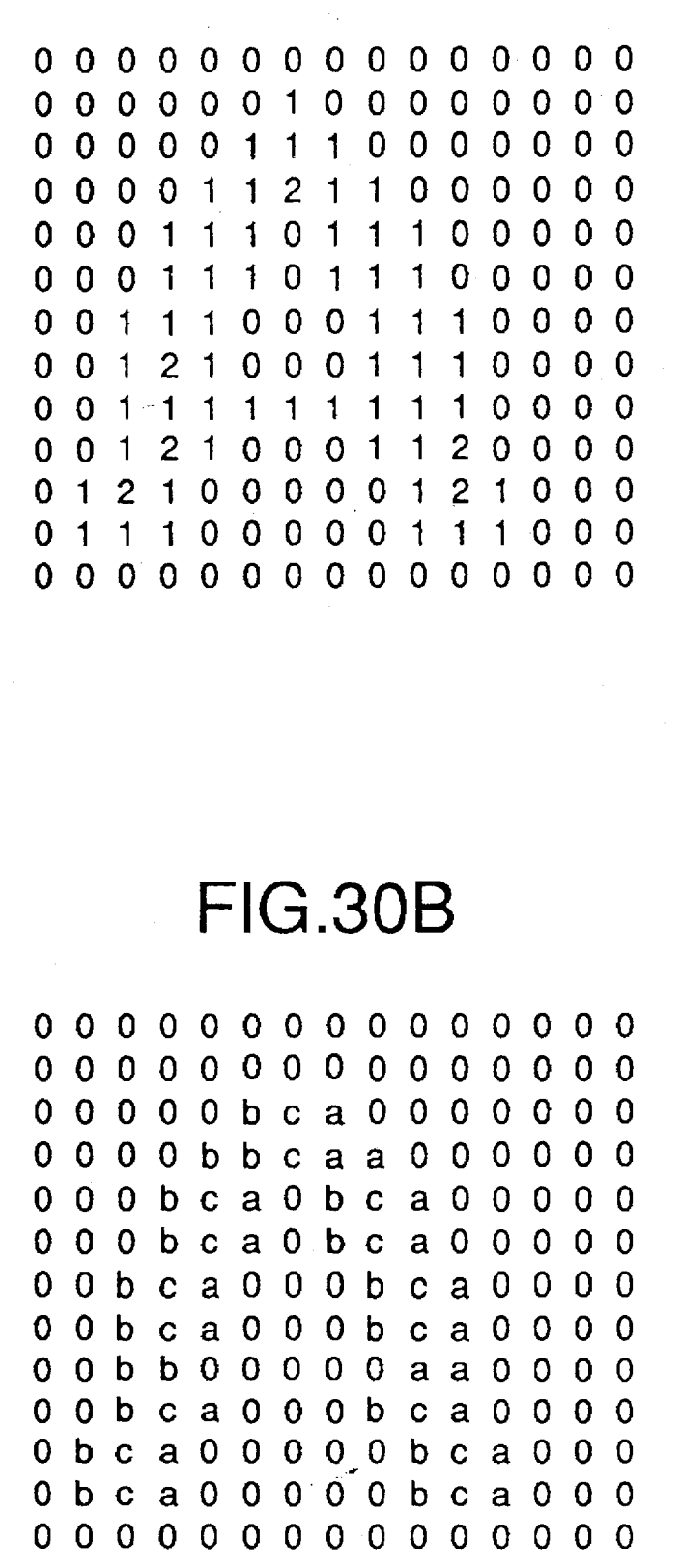
Figures 31A, 31B:
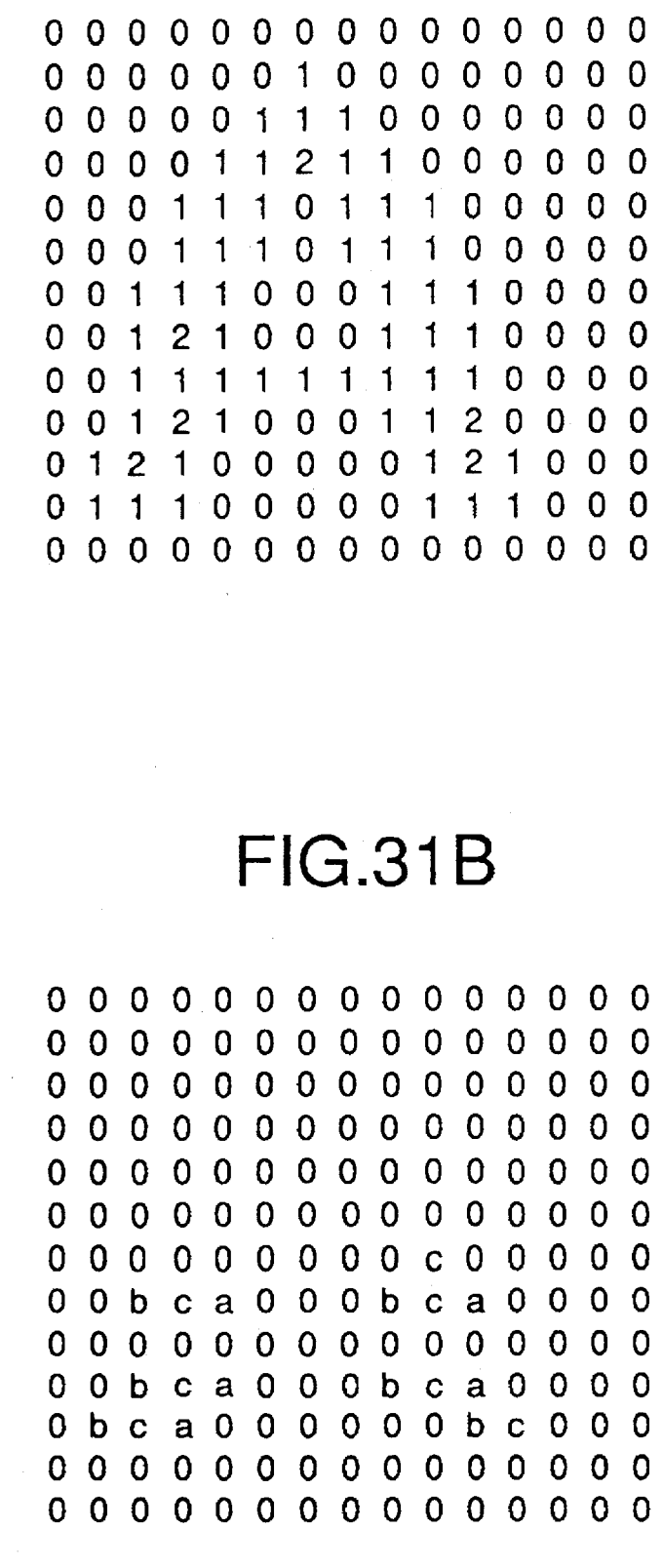

FIG. 30A shows original data when gray-levels for the data is set at 1, and FIG. 30B shows results of edge discrimination of the original data referring to a left pixel and a right pixel. FIGS. 31A and 31B indicate the results of edge discrimination by the conventional method using a fixed discriminating condition with a gray-level value set at 3. The effect of the present invention may be clearly understood by comparing the edge discrimination results of FIGS. 30A, 30B and FIGS. 31A, 31B.

Edge discrimination with left, right, up and down references is conducted according to the flow charts of FIGS. 20 to 23. Discrimination flag patterns are produced as shown in FIG. 32. FIG. 33 is a view for explaining the direction of reading pixels in case of discriminating an attentional pixel with respective right, left, up and down references.

Referring to FIG. 29, a discriminating pattern shown therein includes a series of same figures, e.g., discriminating pattern No. <b b>, that may be explained as follows: A part (portion A) of the original data of FIG. 28 is shown below in Table 1.

TABLE 1

|   |   |   |   |   |   |   | Horizontal Scanning |
|---|---|---|---|---|---|---|---|
| 0 | 0 | 1 | 2 | 2 | 0 | 0 | |
| 0 | 0 | 1 | 3 | 2 | 0 | 0 | |
| 0 | 0 | 1 | 2 | 2 | 2 | 2 | |
| 0 | 0 | 1 | 2 | 2 | 0 | 0 | |
| 0 | 0 | 2 | 2 | 0 | 0 | 0 | |

Processing is executed according to the flow chart shown in FIGS. 20 to 23. The results of edge detection are shown in Table 2.

TABLE 2

Note:

| | |
|---|---|
| ABCDE | (A left referred edge) → Judged as an edge |
| 00122 | Original data horizontally scanned |
| EDCBA | (A right referred edge) → Judged as non-edge |

Note:

| | |
|---|---|
| ABCDE | (An up referred edge) → Judged as an edge |
| 11112 | Original data vertically scanned |
| EDCBA | (A down referred edge) → Judged as a non-edge |

When the discrimination results are applied to the discriminating patterns (1; edge, 0; Non-edge) of FIG. 32, data is described as follows:

TABLE 3

| Left ref. edge | Right ref. edge | Up ref. edge | Down ref. edge |
|---|---|---|---|
| 1 | 0 | 0 | 0 |
| | Discrimination Flag | 2 | |
| | Discriminating pattern: | b | |

Similarly, the data on the subsequent line are processed according to the flow charts of FIGS. 20 to 23. The edge discrimination results are as follows:

TABLE 4

Note:

| | |
|---|---|
| ABCDE | (A left referred edge) → Judged as an edge |
| 01222 | Original data horizontally scanned |
| EDCBA | (A right referred edge) → Judged as non-edge |

Note:

| | |
|---|---|
| ABCDE | (An up referred edge) → Judged as a non-edge |
| 23222 | Original data vertically scanned |
| EDCBA | (A down referred edge) → Judged as a non-edge |

When the discrimination results are applied to the discriminating patterns of FIG. 32, the data is described as follows:

TABLE 5

| Left ref. edge | Right ref. edge | Up ref. edge | Down ref. edge |
|---|---|---|---|
| 1 | 0 | 0 | 0 |
| | Discrimination Flag | 2 | |
| | Discriminating pattern: | b | |

This causes the discrimination flag to have <22> or the discriminating pattern number to be <bb>. <11> appear by the same reason.

Figure 34:
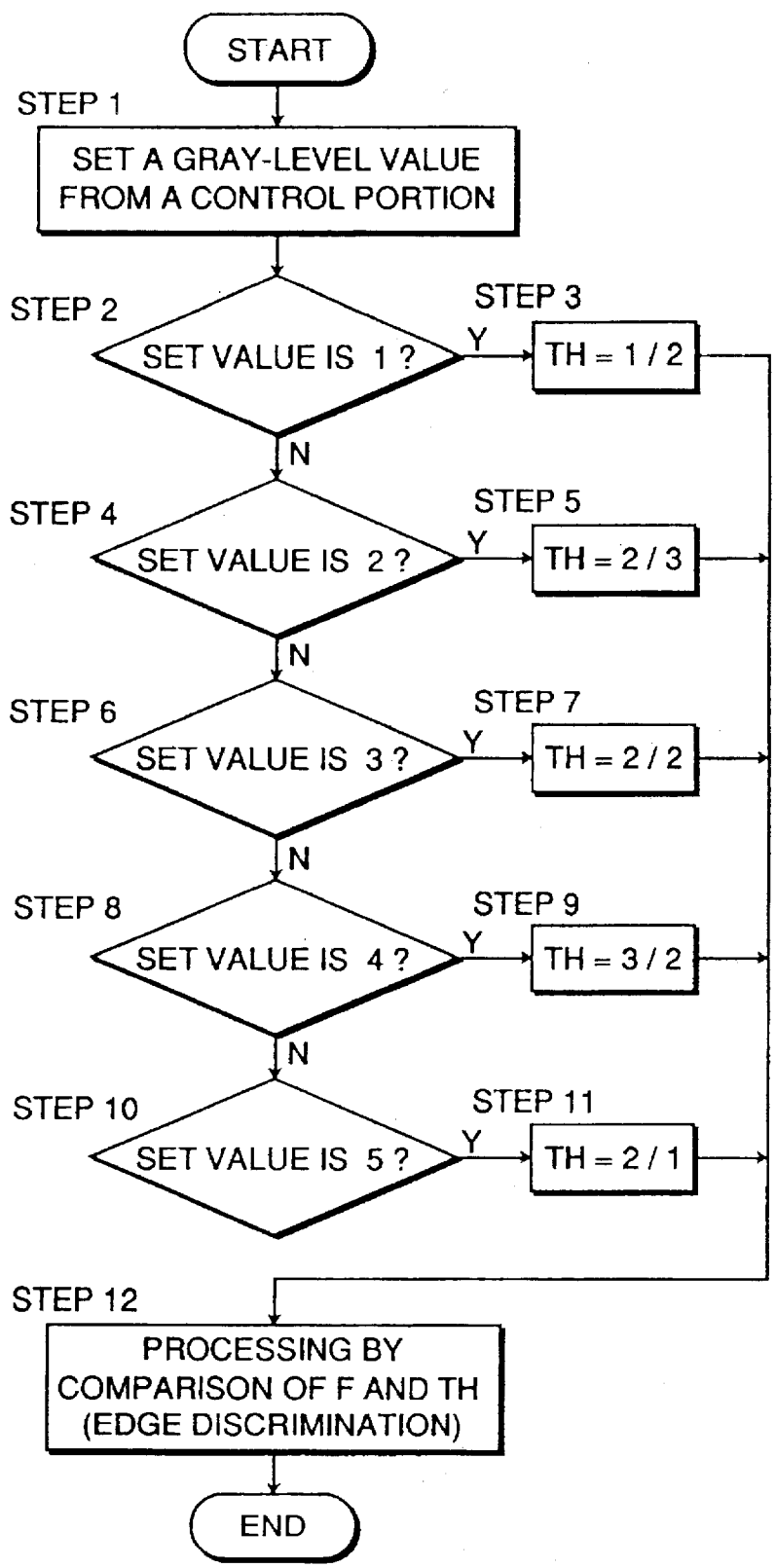
FIG. 34 is a flow chart for explaining how to discriminate an edge in relation to a set value of gray-levels according to the present invention.

FIG. 34 is a flow chart for edge discrimination for a set gray-level value, which includes the following steps:

Step 1 is to set a gray-level value from a control portion.
Step 2 is to check whether the set value is 1 or not. Step 3 is to select TH=½ if the set value is 1. Step 4 is to check whether the set value is 2 or not if the set value is not 1 (at Step 3). Step 5 is to select TH=⅔ if the set value is 2. Step 6 is to check whether the set value is 3 or not, if the set value is not 2 (at Step 4). Step 7 is to select TH=3/2 if the set value is 3. Step 8 is to check whether the set value is 4 or not if the set value is not 3 (at Step 6). Step 9 is to select TH=3/2 if the set value is 4. Step 10 is to check whether the set value is 5 or not if the set value is not 4 (at Step 8). Step 11 is to select TH=¾ if the set value is 5. Step 12 is to carry out the processing by comparison of F and TH.

An example of a region segmentation of pixels according to the results of edge discrimination with right/left references and up/down references is first described.

Figure 35:
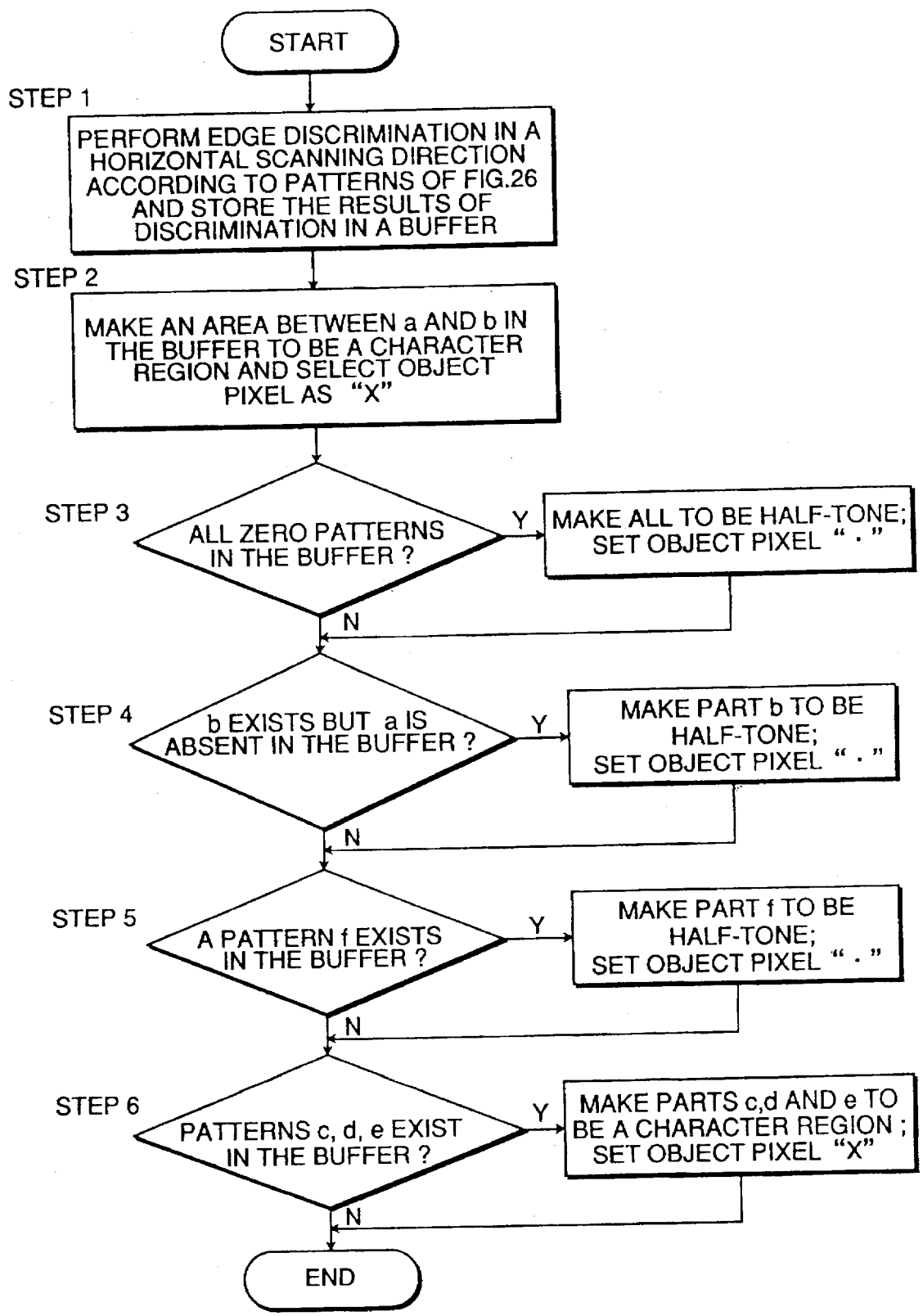
FIG. 35 is a flow chart for dividing a region according to the present invention.

FIG. 35 is a flow chart for region segmentation of pixels, which includes the following steps:

Step 1: Conduct edge discrimination in a horizontal scanning direction and store the results of discrimination by 1 line in a buffer.

Step 2: Judge a region of "a" to "b" as a character region even if 0 is inserted between "a" and "b".

Steps 3 to 6: Special processing steps to judge any region as a half-tone region if a discriminating pattern includes only zeroes excepting the case of Step 2.

If there is only a pattern "b", a whole region is of a half-tone.

If there is only a pattern "f", a whole region is of a half-tone.

A whole region is considered as a region of characters if there is only a pattern "c" or "d" or "e".

Figures 36, 37:
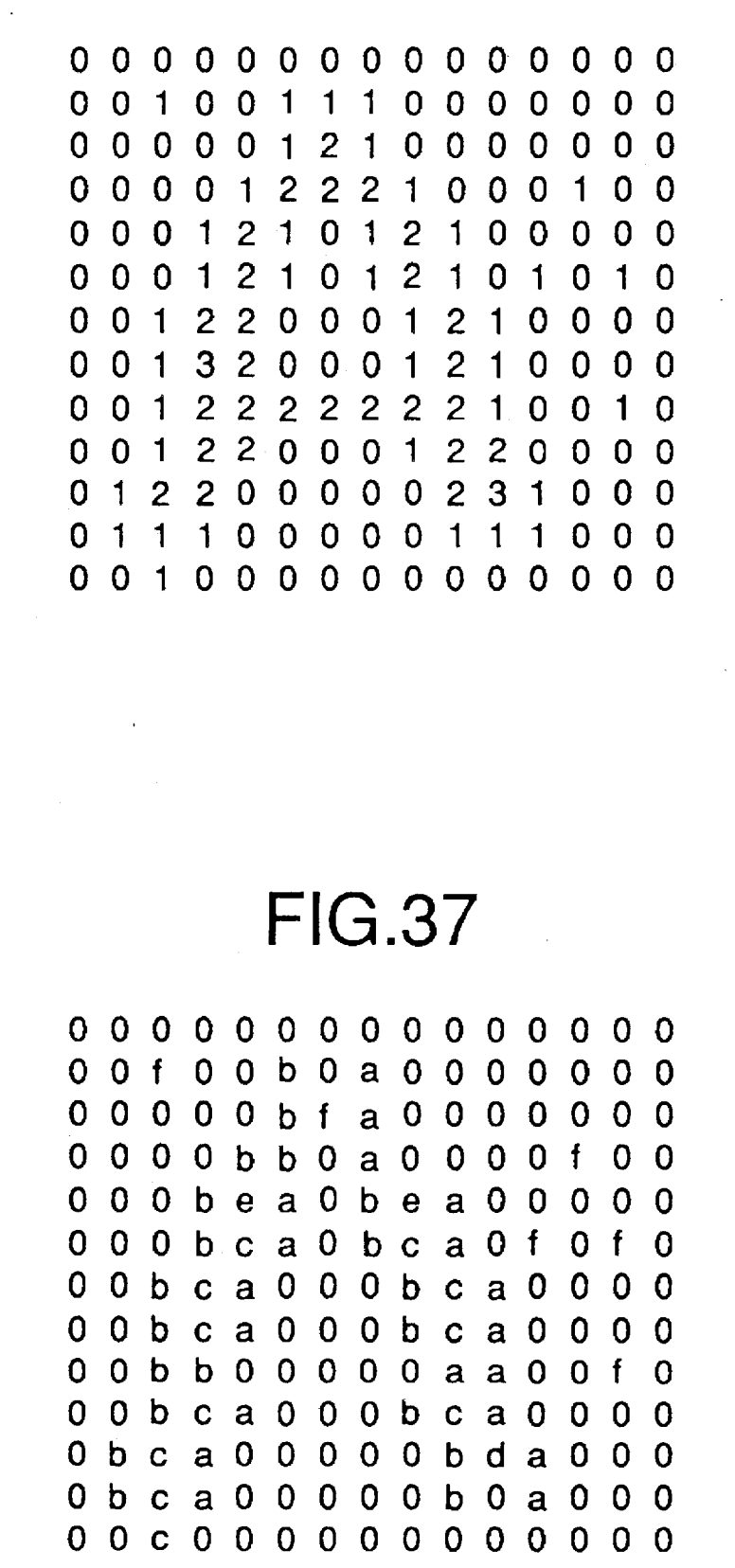
Figure 38:
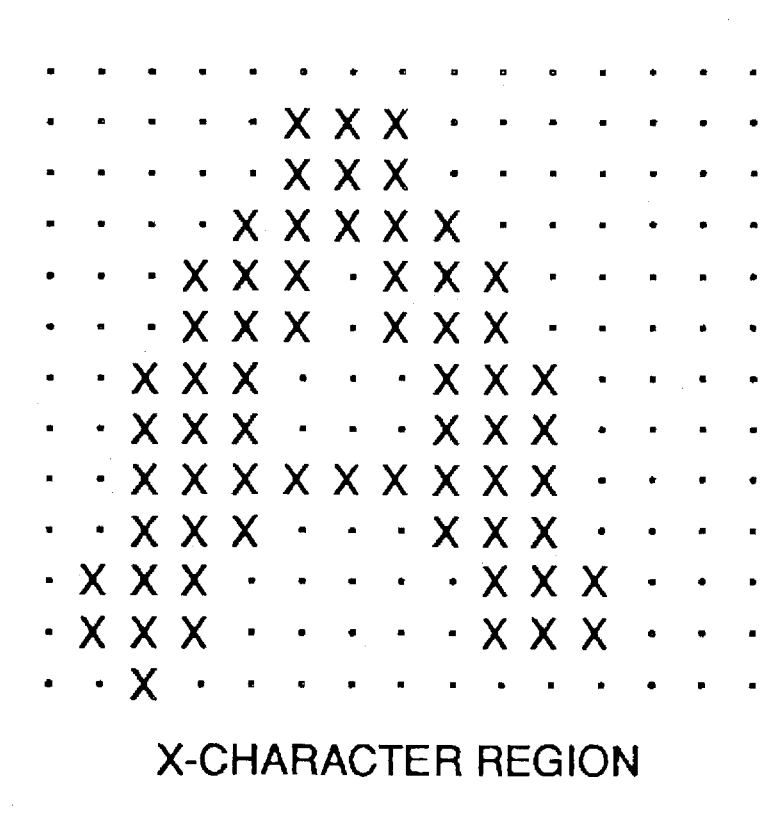

Results of the above-mentioned processing are shown in FIGS. 36 to 38.

Figure 39:
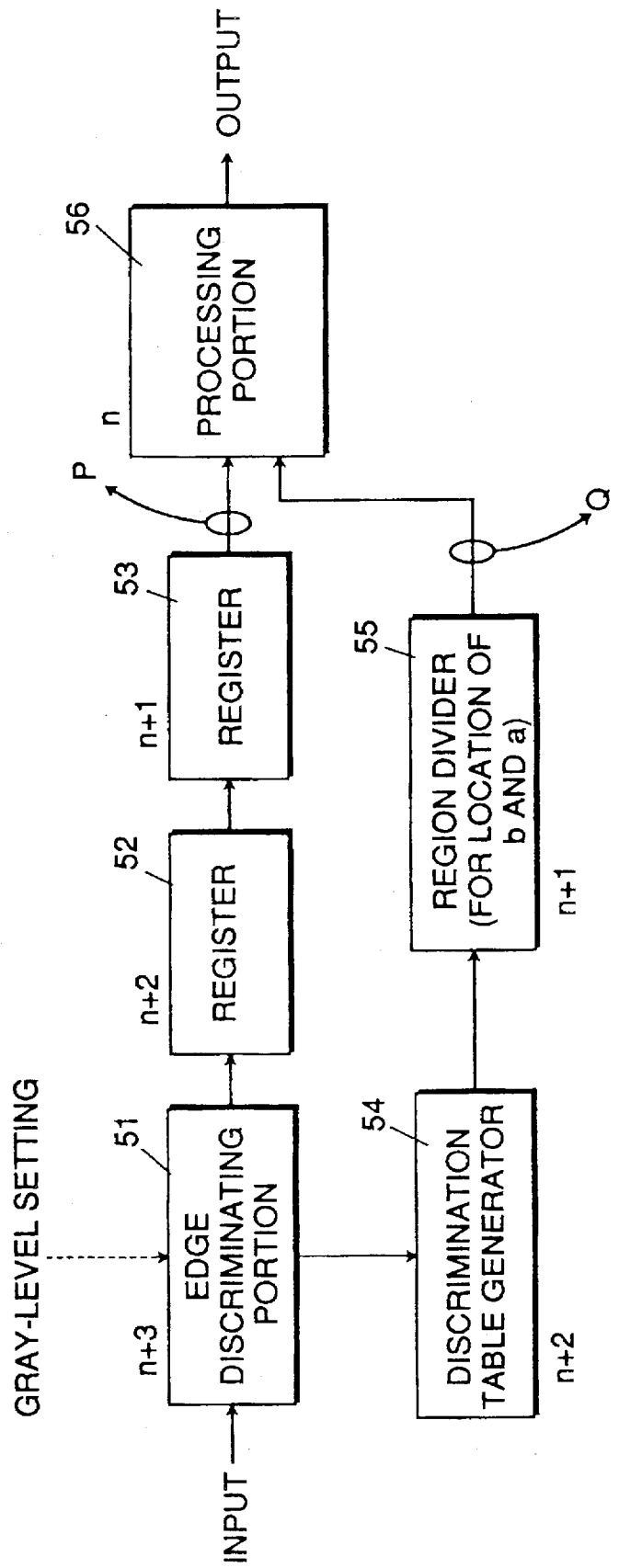
FIG. 39 is a block diagram showing another example of an image processing device according to the present invention.

FIG. 39 is a block diagram for showing image processing of the present invention which includes an edge discriminating portion 51, registers 52 and 53 for delay transferring of data (for 2 lines), a discrimination table generating portion 54, a region segmenting portion 55 (location of b and a) and a processing portion 56. In FIG. 39, P designates image data and Q designates a signal of region discrimination result.

The edge discriminating portion 51 conducts edge discrimination according to the present invention and the discrimination table generating portion 54 prepares a table of discrimination patterns. Input data is stored in the registers 52 and 53 and transferred to the processing portion after the region segmenting portion 55 has finished processing for region segmentation. The processing portion 56 then performs the required processing on the input data.

While the known systems provide only an enhancement by changing of gray levels of image data, the present invention makes it possible to convert gray-levels of image data to be suitable for a printer to reduce the irregularity of the edge portion which may arise in the process of quantizing the image data. Especially, in an edge portion of pixels quantized at gray-levels of 0 and 1, portion 1 looks projected since the portion 0 is not printed. According to the present invention, it is possible to obtain finely printable edge portions of an image by providing variable data-conversion for edges when input data is being quantized and by providing data conversion to change the printing method by a printer.

Practical example (1): Data input through an image input device are read as digital data of 256 gray levels for a pixel. The data is quantized into n-valued data. Conversion of the data into n-valued data is carried out by applying an error-diffusing method. The quantized data is then examined as to whether it relates to an edge portion or a non-edge portion. The edge discrimination is realized as follows:

First, a gradient of gray-levels is assumed as TH which is one of the discriminating conditions. An attentional pixel C is selected. A reference value S=1 is preset for edge discrimination. In short, data <0>denotes that there is no data. S is a minimal value representing an image.

Figures 40, 41:
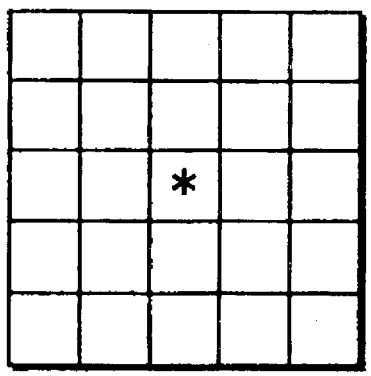
FIG. 40 shows data of an image for edge discrimination according to the present invention.
FIG. 41 shows a table of flags representing the result of edge discrimination according to the present invention.

Referring to FIG. 40, pixels to be observed, located A, B, C, D and E, are selected and a pixel C among them is selected as an attentional one. When the attentional pixel C is >=S, it is an object to be discriminated. If the pixel C is not >=S, it is judged as a non-edge portion and a subsequent attentional pixel is selected.

When the attentional pixel C is >=S and <2×S, the following operations are performed:

(1) If B<S, D>=C and D>=E, 0 has a value of B and T has a value of D.

(2) If B<S, D>=C and D<E, 0 has a value of B and T has a value of D.

(3) If B>=S, A<S and D>=B, 0 has a value of A and T has a value of C.

When the attentional pixel C is >2×S the following processing operations are performed:

(1) If B<S, 0 is considered to have a value of B and T is considered to have a value of C.

(2) If B>=S, A<S and D>=B, 0 is considered to have a value of A and T is considered to have a value of C.

An equation $(T-0)/(2 \times S)=F$ is calculated. The obtained value F is taken as a gradient at the attentional pixel. If the value F is larger than the value TH, the pixel is judged to be of an edge portion. In this case, the data A, B, C, D and E are examined in two directions-left and right as shown in FIG. 40. The result is defined in a table of flags shown in FIG. 41. The state of the attentional pixel is judged according to the table of flags. When the pixel is a left referred edge, the data is set at 1. When the pixel is a right referred edge, the data is set at 2. Data relating to an edge portion on an image is converted from 1 to 2 to enhance the edge on the image.

Figures 43A, 43B:
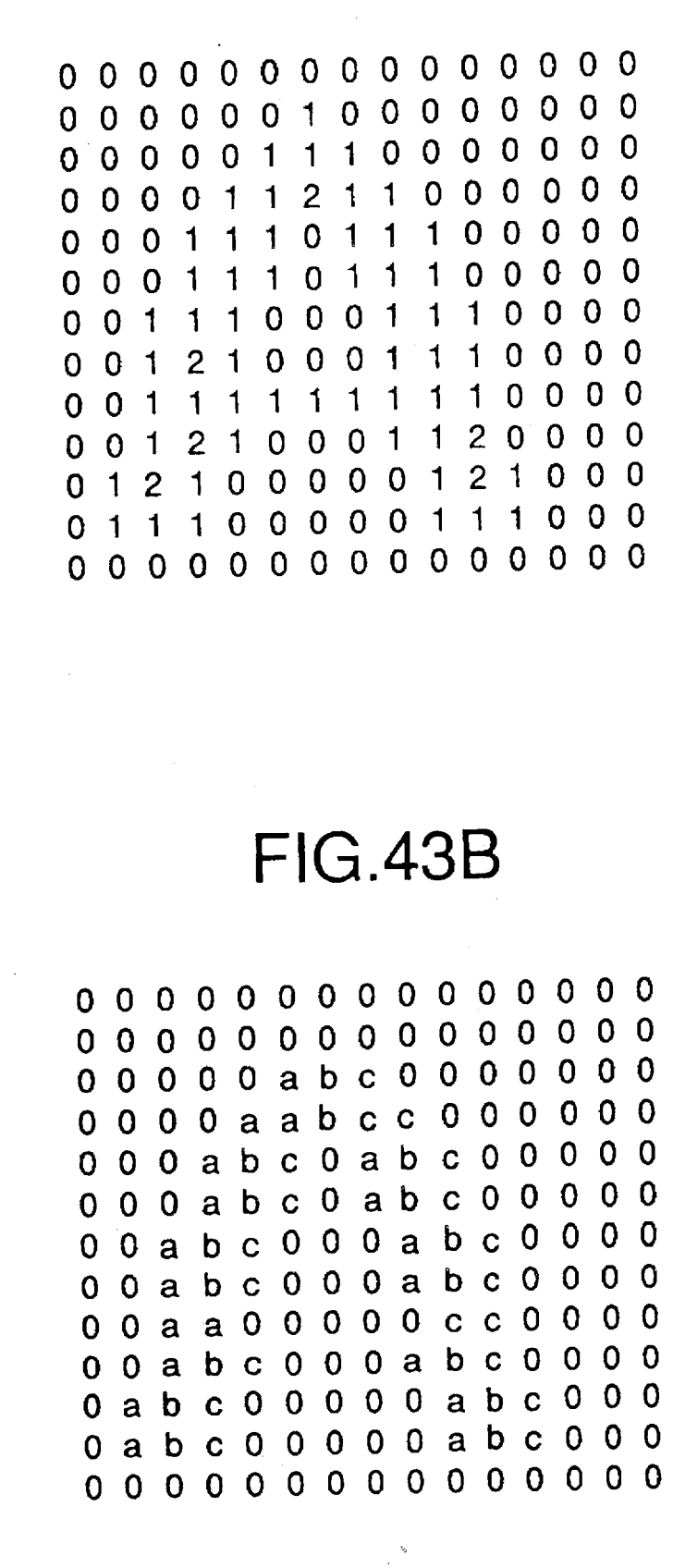

A discrimination pattern used in this case (left reference) is shown in FIG. 42. FIG. 43B shows the results of edge discrimination made on original data shown in FIG. 43A.

Practical example (2): Based on the edge discrimination in the practical example (1), data is converted to 1 for a left-referred edge and is converted to 2 for a right-referred edge. Data valued at 2 is converted to data valued at 3. Since input data quantized to n-valued data (n=4) can be valued at 0, 1, 2 or 3, the values 1 and 2 are treated as edge processing data.

One pixel is expressed by one of 4 values obtained through the data conversion. A laser-ON position in the time-width of a laser ON-OFF signal is changed according to a control signal of a printing device (this is determined by data supplied to the printing device). This time-width igniting position is determined by an input converting circuit which converts input data in such a way that 6 even blocks of 1 pixel may be turned ON or OFF independently. The laser is radiated according to this information. This assures smooth processing of an edge portion.

Figure 44:
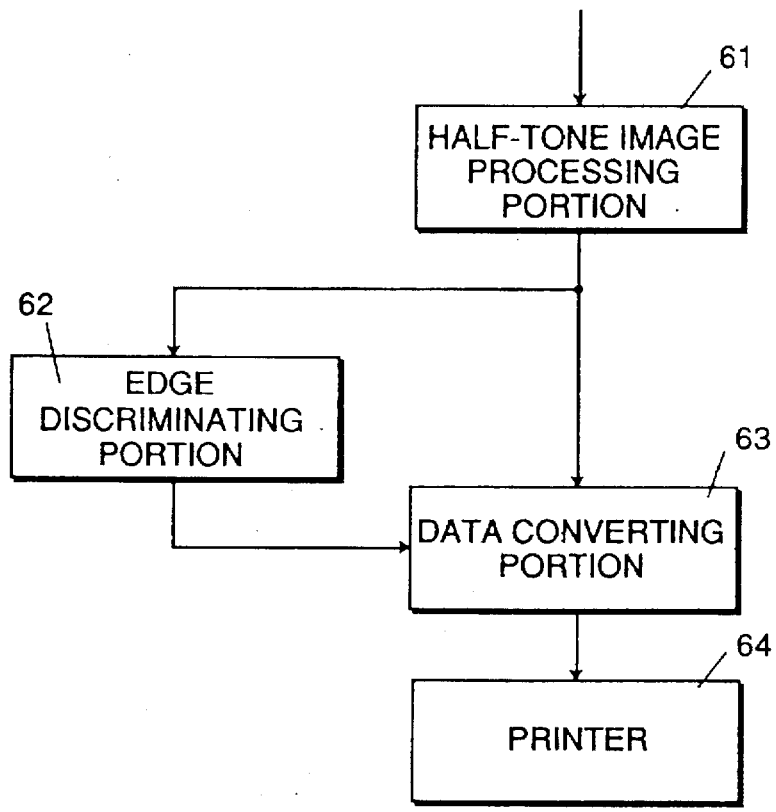
FIG. 44 is a construction view for explaining the present invention.

FIG. 44 is a block diagram showing another example of an image processing device according to another embodiment of the present invention. In FIG. 44, numeral 61 designates a gray-level processing portion, 62 an edge discriminating portion, 63 a data converting portion and 64 a printer.

Figure 45:
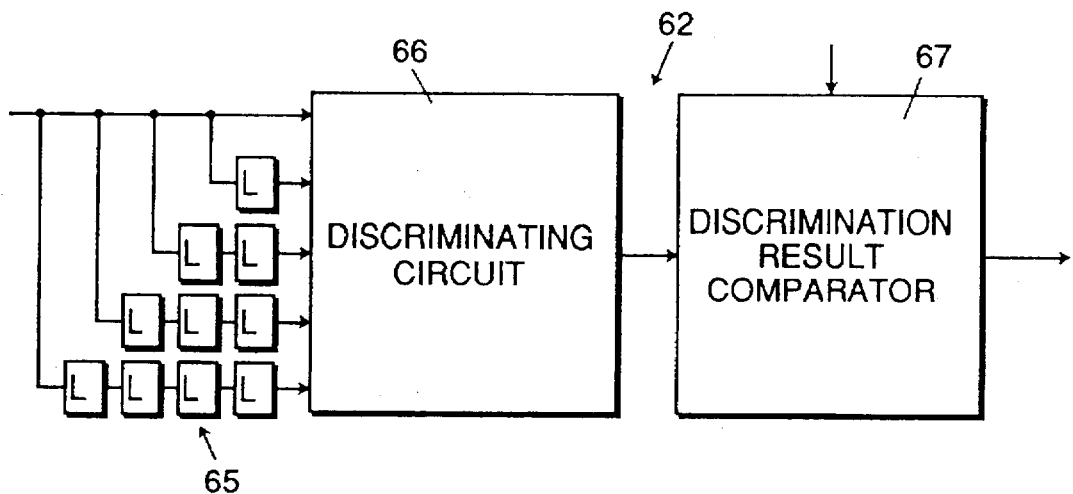
FIG. 45 is a construction view of an edge discriminating portion shown in FIG. 44.

FIG. 45 shows the edge discriminating portion of FIG. 42, wherein numeral 65 designates a latch circuit, 66 a discriminating circuit and 67 a comparator for comparing the discrimination results. The latch circuit 65 serves to put off the timing by 1 pixel.

Figure 46A:
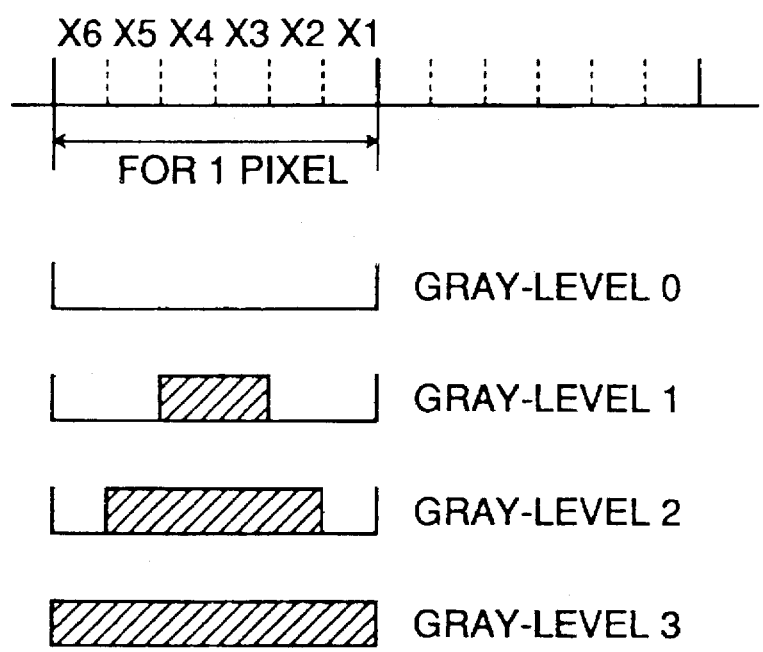
FIGS. 46A and 46B are views for explaining how to determine a switching-ON of position laser radiation according to the present invention.
Figure 46B:
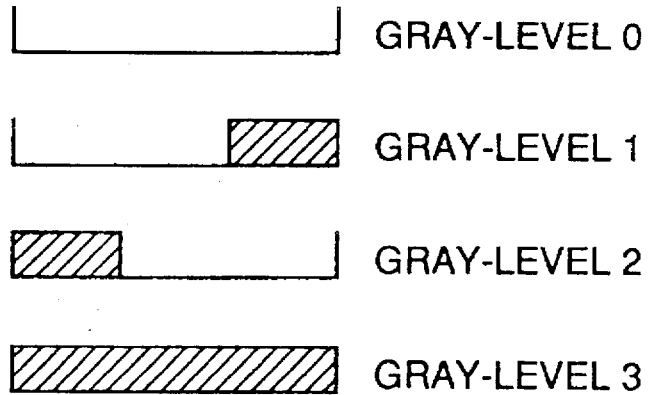

FIGS. 46A and 46B are a view for explaining laser-ON positions. The image processing device according to the present invention uses radiating positions preset as shown in FIG. 46B. A hatched block shows a laser-ON position. Numeral 1 denotes a left edge and numeral 2 denotes a right edge.

Figure 47:
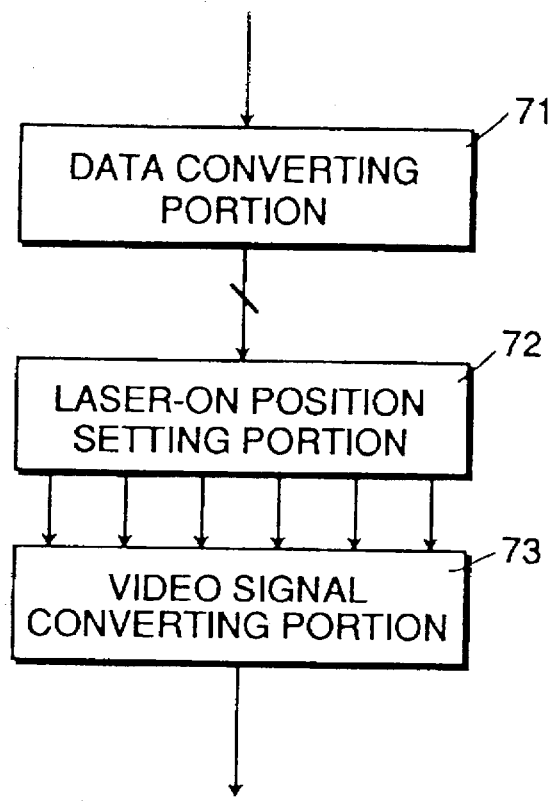
FIG. 47 is a construction view of a setter of the switching-ON position of a laser radiation according to the present invention.
Figure 48:
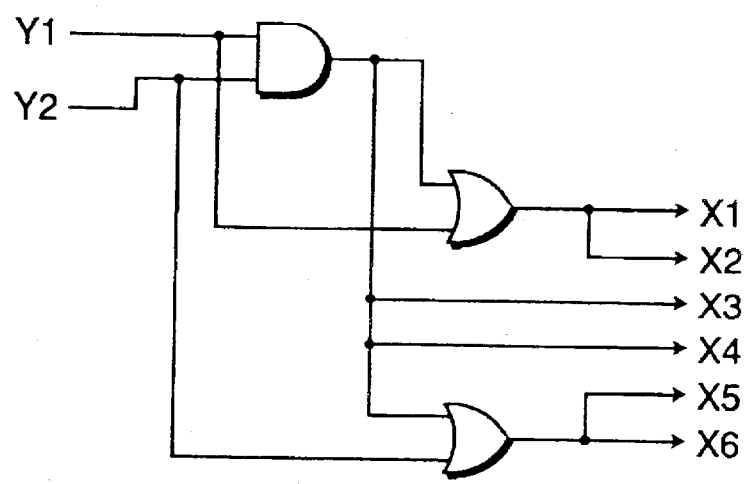
FIG. 48 is a circuit for setting the switching-ON position of a laser radiation according to the present invention.

FIG. 47 is a view for explaining a system for setting laser-ON positions. In FIG. 47, numeral designates a data converting portion and numeral 73 designates a video-signal converting portion. A practical circuit for setting Laser-ON positions is shown in FIGS. 46A and 46B.

FIG. 49A is a flow chart for automatically measuring gray-levels and determining thresholds, which includes the below-described steps. FIG. 49B shows a table of thresholds.

A check is made as to whether or not a gray-level setting signal is input from a control portion (Step 1). When the signal is input, operation proceeds to a flow chart of FIG. 34. If there is no input signal, a copy starting operation is performed (Step 2). If the copy start cannot be realized, the operation is returned to Step 1. When the copying operation starts, an image is pre-scanned (Step 3) and gray-levels of the image are measured (Step 4). An original is checked as to whether it is a photographic original or a character-printed original (Step 5). TH=$\frac{2}{3}$ is set for the character original (Step 6) and TH-$\frac{1}{2}$ is set for the photographic original (Step 7). Edge discrimination is now conducted (Step 8).

According to the present invention, it is possible to eliminate the need of preparation and extraction of specified patterns used for edge discrimination by conventional method and furthermore to reduce the possibility of mis-discrimination due to insufficiency of edge discriminating conditions. The application of the proposed method improves the accuracy of edge detection and assures fine and accurate discrimination of edge portions and non-edge portions of an image.

In view of solving a problem of the prior art with respect to fixed-value parameters, the present invention provides the possibility of setting edge discriminating parameters suitable for gray-levels of an image. Thereby, effective edge discrimination can be made on the image subjected to gray-level conversion. In short, a faint image having low gray-levels can be processed by use of parameters for faint image data. In reverse cases, parameters for deep image data are applied.

This edge discriminating function can be applied when image data is being corrected for obtaining the improved quality of a final image. Furthermore, the detected edges are classified into left edges and right edges. A region can be easily segmented.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds, are therefore intended to be embraced by the claims.

We claim:

1. An image processing device for determining whether or not pixels of an input image are part of an edge portion of the image, comprising:

gray-level detecting means for detecting gray-levels of pixels of the input image;

operational means for generating at least two adjacent gray-level difference signals, each gray-level difference signal generated from a difference between the detected gray-levels of a pair of pixels adjacent to each other, the respective pairs of adjacent pixels for two adjacent gray-level difference signals including one common pixel;

gray-level discriminating means for comparing the at least two generated adjacent gray-level difference signals from said operational means to a variable threshold value including first and second threshold values; and edge discriminating means for determining whether or not each of the pixels of the input image are part of an edge portion of the image from the comparing of said gray-level discriminating means, wherein said gray-level discriminating means compares the at least two generated adjacent gray-level difference signals to the first threshold value, and compares the at least two generated adjacent gray-level difference signals to the second threshold value, which is less than the first threshold value, upon determining that the at least two generated adjacent gray-level difference signals are less than the first threshold value.

2. The image processing device of claim 1, wherein said edge discrimination means determines that pixels of the input image are part of an edge of the image upon said gray-level discriminating means determining that any one of the at least two generated adjacent gray-level difference signals is at least equal to the first threshold value.

3. The image processing device of claim 2, wherein said edge discrimination means determines that pixels of the input image are part of an edge of the image upon said gray-level discriminating means determining that at least three gray-level difference signals, each adjacent to at least one other gray-level difference signal, are equal to the second threshold value.

4. The image processing device of claim 3, wherein said operational means generates at least three gray-level difference signals, each adjacent to at least one other gray-level difference signal, and wherein said gray-level discriminating means compares at least two non-adjacent gray-level difference signals to a third threshold value, less than the second threshold value.

5. The image processing device of claim 4, wherein said edge discrimination means determines that pixels of the input image are part of an edge of the image upon said gray-level discriminating means determining that the at least two non-adjacent gray-level difference signals are equal to the third threshold value and upon determining that at least one remaining gray-level difference signal, adjacent to at least one of the two non-adjacent gray-level difference signals, is equal to the second threshold value.

6. The image processing device of claim 5, wherein said gray-level discriminating means compares at least one gray-level difference signal to the second threshold value and compares at least one other gray-level difference signal, adjacent to the at least one gray-level difference signal, to the third threshold value, less than the second threshold value.

7. The image processing device of claim 6, wherein said edge discrimination means determines that pixels of the input image are part of an edge of the image upon said gray-level discriminating means determining that at least one gray-level difference signal is equal to the second threshold value and at least one other gray-level difference signal, adjacent to at least one gray-level difference signal determined to be equal to the second threshold value, is equal to the third threshold value.

8. The image processing device of claim 1, wherein said operational means generates at least three gray-level difference signals, each adjacent to at least one other gray-level difference signal and wherein said edge discrimination means determines that pixels of the input image are part of an edge of the image upon said gray-level discriminating means determining that the at least three gray-level difference signals are equal to the second threshold value.

9. The image processing device of claim 1, wherein said operational means generates at least three gray-level difference signals, each adjacent to at least one other gray-level difference signal, and wherein said gray-level gradient discriminating means compares at least two non-adjacent gray-level difference signals to a third threshold value, less than the second threshold value.

10. The image processing device of claim 9, wherein said edge discrimination means determines that pixels of the input image are part of an edge of the image upon said gray-level discriminating means determining that the at least two non-adjacent gray-level difference signals are equal to the third threshold value and upon determining that at least one remaining gray-level difference signal, adjacent to at least one of the two non-adjacent gray-level difference signals, is equal to the second threshold value.

11. The image processing device of claim 1, wherein said gray-level discriminating means compares at least one gray-level difference signal to the second threshold value and compares at least one other gray-level difference signal, adjacent to the at least one gray-level difference signal, to a third threshold value, less than the second threshold value.

12. The image processing device of claim 11, wherein said edge discrimination means determines that pixels of the input image are part of an edge of the image said the gray-level discriminating means determining that at least one gray-level difference signal is equal to the second threshold value and at least one other gray-level difference signal, adjacent to the at least one gray-level difference signal determined to be equal to the second threshold value, is equal to the third threshold value.

* * * * *